(12) United States Patent
Katsuramaki et al.

(10) Patent No.: US 10,686,310 B2
(45) Date of Patent: Jun. 16, 2020

(54) POWER SUPPLY STRUCTURE FOR MOVABLE BODY AND EXTRA PART DRAW-IN MECHANISM

(71) Applicant: Yazaki Corporation, Tokyo (JP)

(72) Inventors: Takahiko Katsuramaki, Shizuoka (JP); Hikaru Sano, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 11 days.

(21) Appl. No.: 16/201,271

(22) Filed: Nov. 27, 2018

(65) Prior Publication Data
US 2019/0165530 A1   May 30, 2019

(30) Foreign Application Priority Data
Nov. 28, 2017  (JP) .................................. 2017-227873

(51) Int. Cl.
| | |
|---|---|
| *B60J 7/057* | (2006.01) |
| *H02G 11/02* | (2006.01) |
| *H01R 35/02* | (2006.01) |
| *B60J 7/043* | (2006.01) |

(52) U.S. Cl.
CPC .............. *H02G 11/02* (2013.01); *B60J 7/043* (2013.01); *B60J 7/0573* (2013.01); *H01R 35/025* (2013.01); *H01R 2201/26* (2013.01)

(58) Field of Classification Search
CPC . B60J 7/05; B60J 7/0573; B60J 7/043; H01R 35/025; H01R 2201/26; H02G 11/00; H02G 11/003; H02G 11/02
USPC ...... 296/223, 221, 155; 191/12.2; 174/378.1
See application file for complete search history.

(56) References Cited

U.S. PATENT DOCUMENTS

| | | | | |
|---|---|---|---|---|
| 6,328,243 | B1 * | 12/2001 | Yamamoto | ......... B65H 75/4449 |
| | | | | 191/12.2 R |
| 2017/0274846 | A1 * | 9/2017 | Katsuramaki | ............ B60J 7/053 |

FOREIGN PATENT DOCUMENTS

JP          2011-151906 A      8/2011

* cited by examiner

*Primary Examiner* — Dennis H Pedder
(74) *Attorney, Agent, or Firm* — Sughrue Mion, PLLC

(57) ABSTRACT

An extra part draw-in mechanism includes a central axis having a winding face for the flat cable on its outer circumferential face, a rotary body arranged around the central axis and rotatably supported with the central axis at a center of the rotary body, an urging member that urges the rotary body in a winding direction of the flat cable, and a slit that is formed in the central axis and has an opening in the winding face of the central axis to accept and hold the flat cable. The opening of the slit in the winding face of the central axis is curved along a winding direction.

6 Claims, 23 Drawing Sheets

POWER SUPPLY STRUCTURE FOR MOVABLE BODY AND EXTRA PART DRAW-IN MECHANISM

CROSS REFERENCE TO RELATED APPLICATION

This application is based upon and claims the benefit of priority from the prior Japanese Patent Application No. 2017-227873 (filing date: Nov. 28, 2017), the entire contents of which are incorporated herein by reference.

BACKGROUND

Technical Field

The present invention relates to a power supply structure for a movable body that supplies electricity from a fixed part to a movable body or from the movable body to the fixed part, and an extra part draw-in mechanism applicable to the structure.

Related Art

A vehicle is equipped with a movable body (such as a sunroof, a sunshade, a side glass, and a seat) that moves with respect to the vehicle body. These movable bodies are supplied with electricity through various conventional structures. JP 2011-151906 A disclosed such a structure including a flat cable, a first extra part draw-in guide case fixed to a fixed part or a vehicle body, and a second extra part draw-in guide case fixed to a movable body or a sunroof. A flat cable coupled to the vehicle body at one end and coupled to the sunroof at the other end. The flat cable is long enough to follow the movement of the sunroof. The flat cable includes an elastic member. The elastic member straightens the flat cable when the flat cable is bent.

The second extra part draw-in guide case covers the first extra part draw-in guide case when the sunroof is closed. In this state, the flat cable is folded to be stored in the first and second extra part draw-in guide cases. No extra part of the flat cable is thus left outside the cases.

The second extra part draw-in guide case is away from the first extra part draw-in guide case when the sunroof is open. In this state, the flat cable is straightened by the elastic member having a straightening characteristic.

The second extra part draw-in guide case covers the first extra part draw-in guide case with one end of the second extra part draw-in guide case lifted when the sunroof is in the tilt-up position. In this state, the flat cable is loosely folded to be stored in the first and second extra part draw-in guide cases. No extra part of the flat cable is thus left outside the cases.

SUMMARY

The above conventional power supply structure for a movable body is difficult to install because the first extra part draw-in guide case should be fixed to a vehicle body and the second extra part draw-in guide case should be fixed to a sunroof. In addition, the conventional structure tends to be large.

If a general cable without the elastic member is used in the conventional structure instead of the cable used in the conventional structure, the structure becomes more complicated.

The present invention has been made to solve the above problems. An object of the present invention is to provide a power supply structure for a movable body that is easy to install and also compact, and an extra part draw-in mechanism applicable to the structure.

A power supply structure for a movable body according to first aspect of the present invention supply electricity from a fixed part to a movable body or the movable body to the fixed part. The power supply structure includes a rail member fixed to the fixed part, a slider that moves along the rail member, and the movable body supported by the slider. The power supply structure for a movable body further includes a flat cable having one end coupled to the fixed part and the other end coupled to the movable body and an extra part draw-in mechanism that winds an extra part of the flat cable. The extra part draw-in mechanism includes a central axis having a winding face for the flat cable on its outer circumferential face, a rotary body arranged around the outer circumferential face of the central axis and rotatably supported with the central axis at its center, an urging member that urges the rotary body in a winding direction of the flat cable, and a slit that is formed in the central axis and has an opening in the winding face of the central axis to accept and hold the flat cable, the opening of the slit in the winding face of the central axis being curved along a winding direction.

An extra part draw-in mechanism according to second aspect of the present invention has a flat cable connecting a fixed part and a movable body and draws in an extra part of the flat cable generated by a movement of the movable body. The extra part draw-in mechanism includes a central axis having a winding face for the flat cable on its outer circumferential face, a rotary body arranged around the outer circumferential face of the central axis and rotatably supported with the central axis at a center of the rotary body, an urging member that urges the rotary body in a winding direction of the flat cable, and a slit that is formed in the central axis and has an opening in the winding face of the central axis to accept and hold the flat cable. The opening of the slit in the winding face of the central axis is curved along a winding direction.

In the power supply structure for a movable body according to a first aspect of the present invention, when the movable body moves in the direction for pulling out the flat cable, the rotary body rotates against the urging force of the urging member and unwinds the flat cable being wound. When the movable body moves in the direction for winding the flat cable, the rotary body rotates due to the urging force of the urging member, winds the flat cable, and draws in an extra part of the flat cable.

When the extra part draw-in mechanism is fixed to the fixed part, for example, the movable body needs no additional component, which makes the installation easy. The extra part draw-in mechanism includes the rotary body that winds the flat cable, and the urging member that urges the rotary body. Both of the rotary body and the urging member have the centers of rotation at their centers, which makes the structure simple. Accordingly, the present invention provides the power supply structure for a movable body that is easy to install and also compact.

In the power supply structure for a movable body and the extra part draw-in mechanism according to an aspect of the present invention, the flat cable changes the shape of winding during the winding or pull-out of the flat cable. When the flat cable is wound and layered on the winding face of the central axis, the flat cable layered at the opening of the slit makes no bump and thus causes no stress concentration around the opening of the slit. When the flat cable is wound loosely around the central axis without being in contact with the winding face, the part of the flat cable led out of the slit moves and comes into contact with the curved portion at the opening of the slit but not with any edge. Again, no stress concentration is caused around the opening of the slit. The flat cable around the opening of the slit thus does not break after the winding and pull-out of the flat cable is repeated many times.

DETAILED DESCRIPTION

Embodiments of the present invention will now be described with reference to the accompanying drawings.

First Embodiment

FIGS. 1 to 12D illustrate a power supply structure for a movable body used for a sunroof apparatus according to a first embodiment of the present invention. Details of the first embodiment are as follows.

Figure 3A:
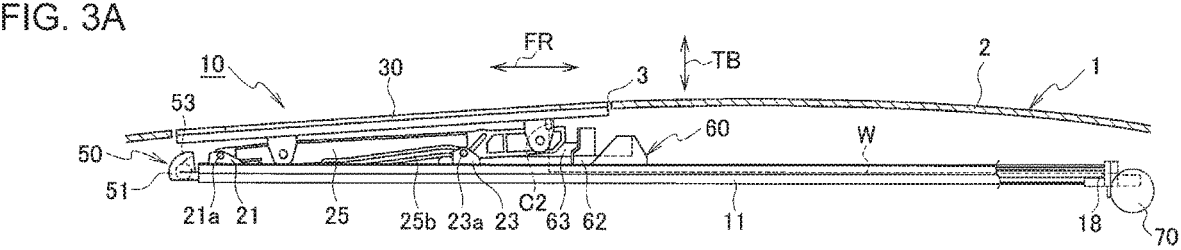
FIG. 3A is a schematic side view illustrating a sunroof in a closed position according to the first embodiment of the present invention.
Figure 3B:
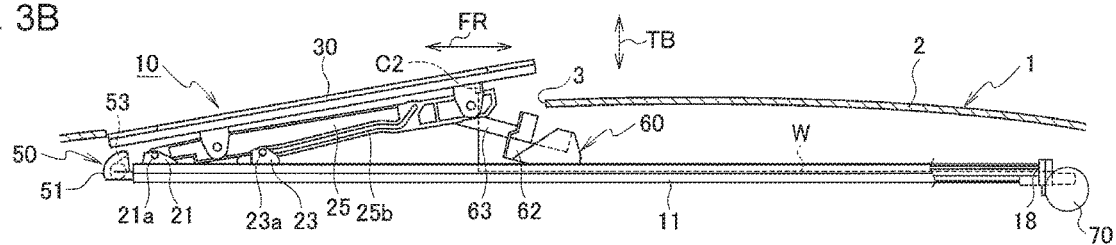
FIG. 3B is a schematic side view illustrating the sunroof in a tilt-up position according to the first embodiment of the present invention.
Figure 3C:
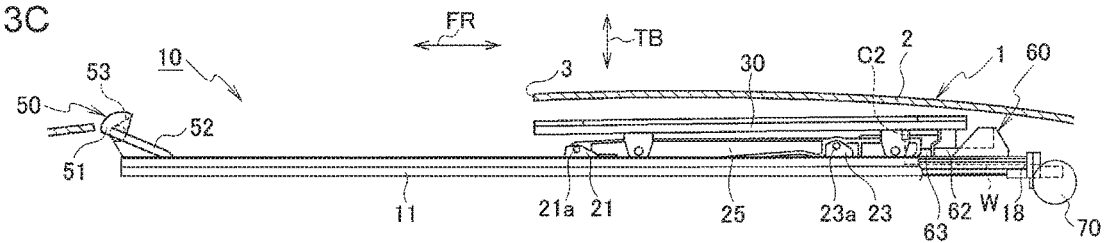
FIG. 3C is a schematic side view illustrating the sunroof in an open position according to the first embodiment of the present invention.

As illustrated in FIGS. 3A to 3C, a vehicle body 1 as a fixed body includes a top panel 2 having an opening 3. The opening 3 is opened and closed by a sunroof apparatus 10.

As illustrated in FIGS. 1 and 3A to 3C and other drawings, the sunroof apparatus 10 includes a pair of rail members 11 arranged along the sides of the opening 3 facing to each other in the vehicle's width direction, a front frame 15 arranged along the front side of the opening 3 and coupled to the front ends of the two rail members 11, a pair of front sliders 21 that moves along the two rail members 11, a pair of rear sliders 23 that moves along the two rail members 11, a pair of middle sliders 25 that moves along the two rail members 11, a movable sunroof 30 supported by the two middle sliders 25, a pair of driving belts 40 that moves the sunroof 30, an actuator 49 that moves the driving belts 40, a deflector 50, and a water receiving member 60.

Figure 1:
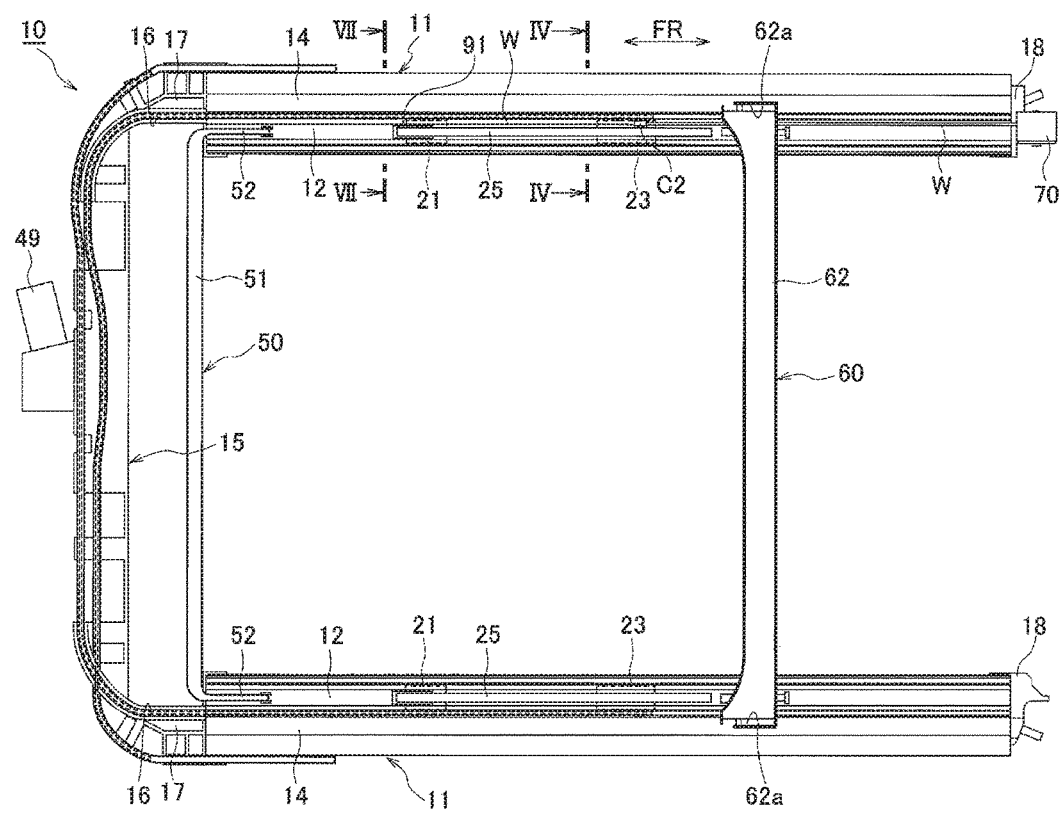
FIG. 1 is a plan view illustrating a sunroof apparatus according to a first embodiment of the present invention.
Figure 2:
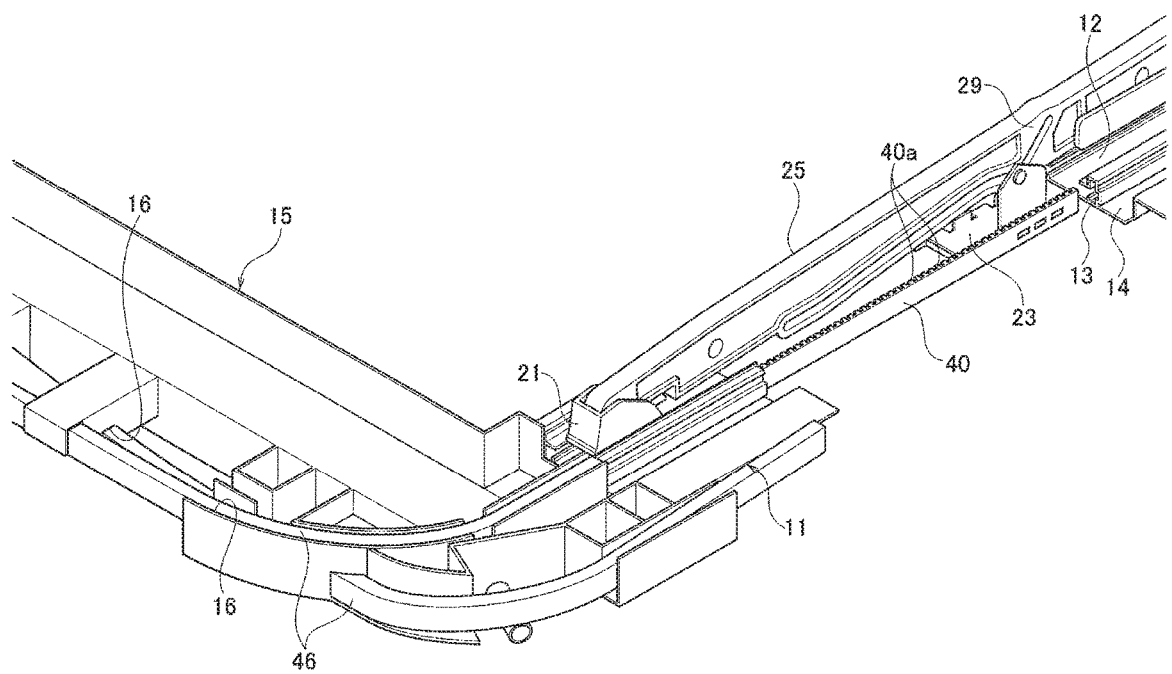
FIG. 2 is a perspective view illustrating an essential part of the sunroof apparatus according to the first embodiment of the present invention.
Figure 4:
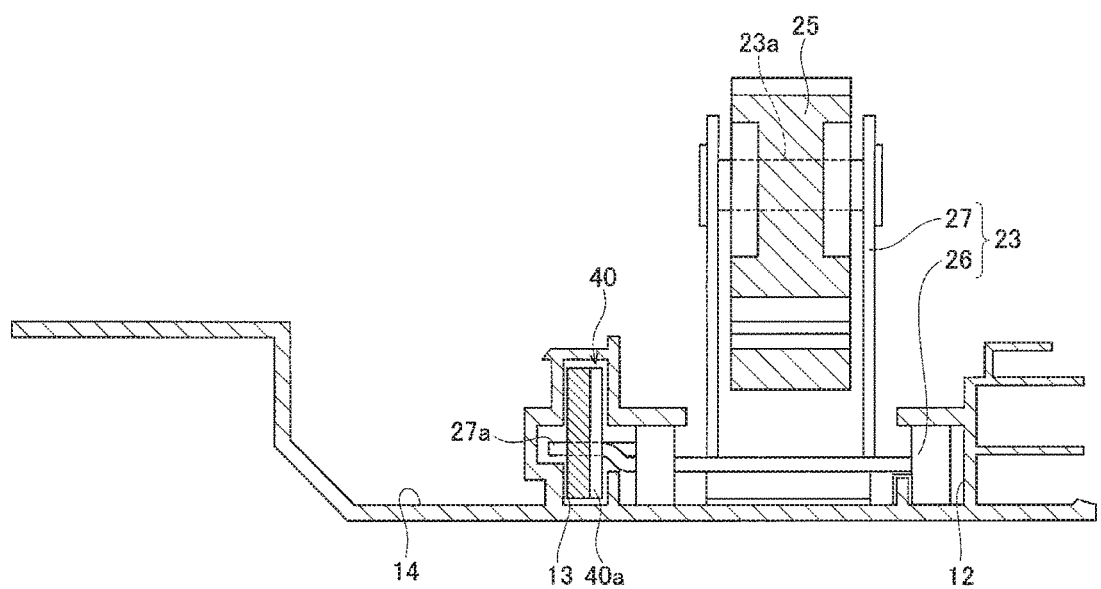
FIG. 4 is a cross-sectional view illustrating a rear slider and a rail member (a cross-sectional view taken along the line IV-IV in FIG. 1) according to the first embodiment of the present invention.
Figure 5:
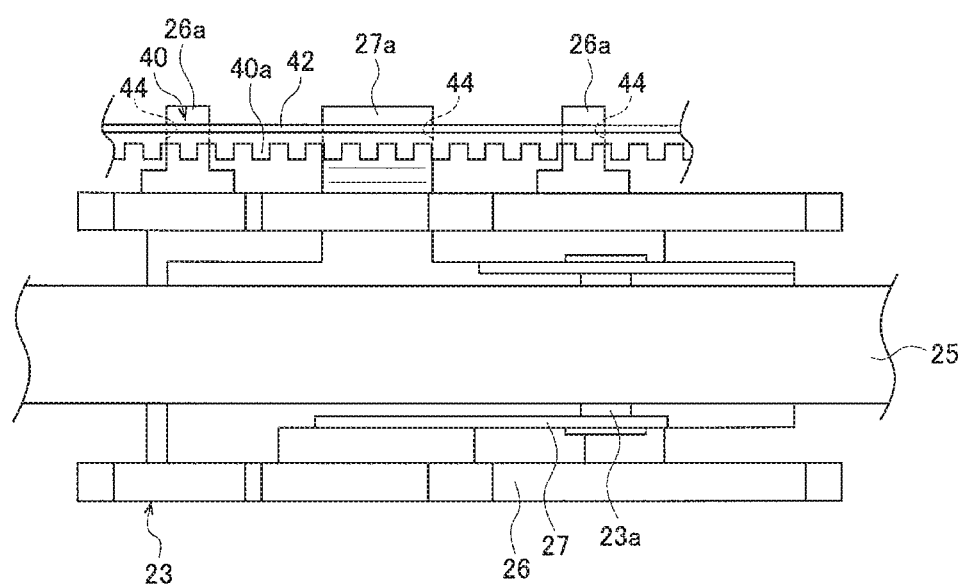
FIG. 5 is a top view illustrating the rear slider and the rail member according to the first embodiment of the present invention.
Figure 6:
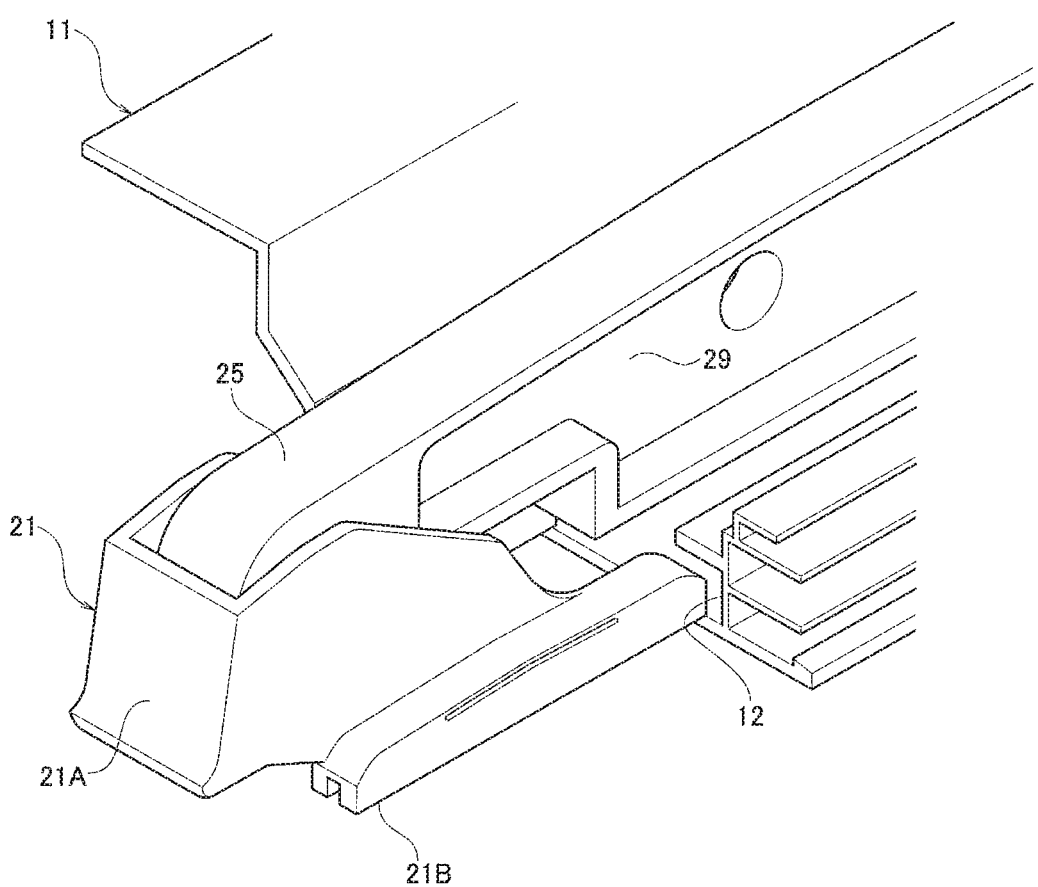
FIG. 6 is a perspective view illustrating a front slider and the rail member according to the first embodiment of the present invention.
Figure 7:
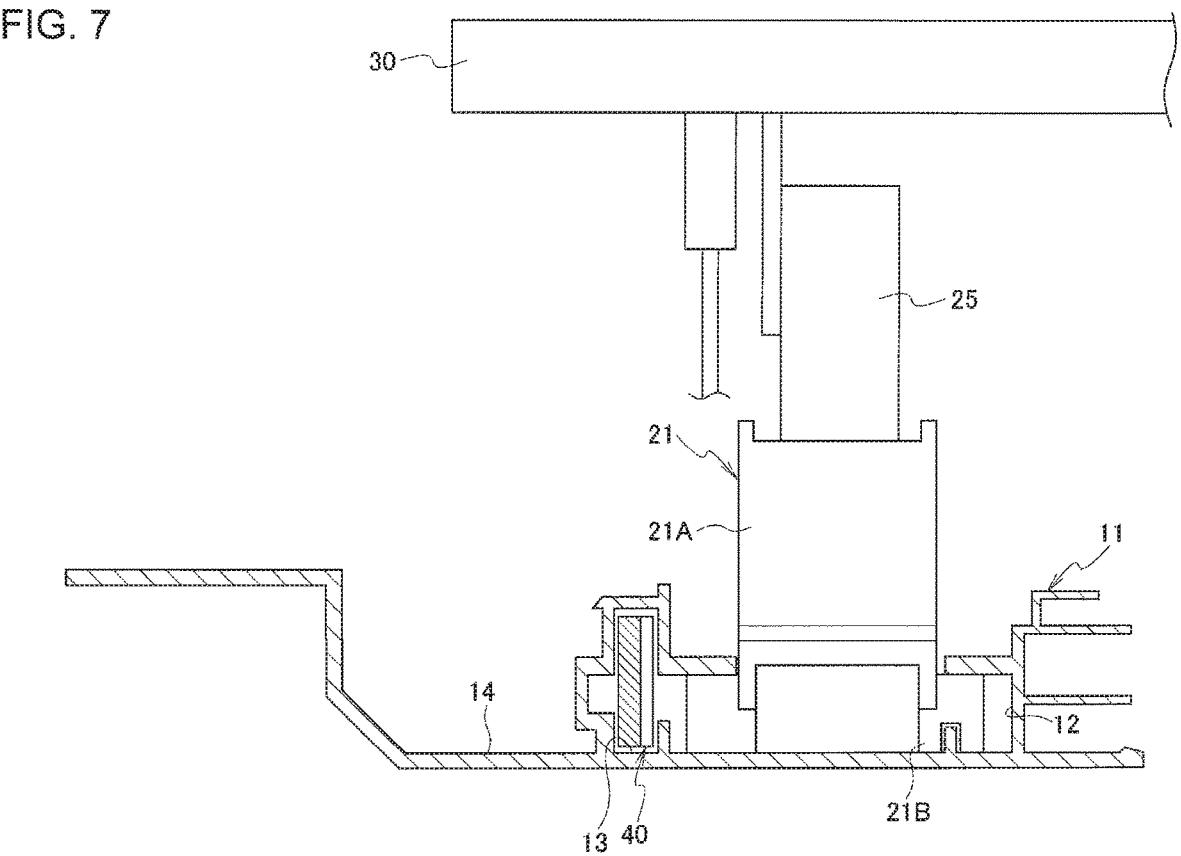
FIG. 7 is a cross-sectional view illustrating the front slider and the rail member (a cross-sectional view taken along the line VII-VII in FIG. 1) according to the first embodiment of the present invention.

As illustrated in FIGS. 1, 2, and 4 and other drawings, each rail member 11 is made of aluminum alloy. In each rail member 11, a slider guiding path 12, a belt guiding path 13, and a drain path 14 are arranged side by side in the width direction of the rail member 11. The slider guiding path 12, the belt guiding path 13, and the drain path 14 extend in the longitudinal direction of the rail member 11.

The right and left belt guiding paths 13 facing to each other in the vehicle's width direction are arranged outside the slider guiding paths 12 in the vehicle's width direction. The right and left drain paths 14 facing to each other in the vehicle's width direction are arranged outside the belt guiding paths 13 in the vehicle's width direction. The right and left drain paths 14 facing to each other in the vehicle's width direction are arranged right under the gaps between the right and left side of the sunroof 30 and the top panel 2, and receive waterdrops or the like falling through the gaps. The drain paths 14 are open-topped grooves. A drain cap 18 is attached to the rear end of each drain path 14 of the corresponding rail member 11 (See FIG. 1). A drain hose (not illustrated) is connected to each drain cap 18.

The front frame 15 is made of synthetic resin, for example. The front frame 15 includes two belt routing paths 16 and a pair of drain paths (right and left drain paths) 17. Each belt routing path 16 is connected to the belt guiding path 13 of the corresponding rail member 11. Each drain path 17 is connected to the drain path 14 of the corresponding rail member 11. A drain cap (not illustrated) is attached to the front end of each drain path 17 of the front frame 15, A drain hose (not illustrated) is connected to each drain cap.

As illustrated in FIGS. 1, 2, and 3A to 3C and other drawings, the two front sliders 21 and the two rear sliders 23 are arranged in the slider guiding paths 12 of the right and left rail members 11 so that one front slider 21 and one rear slider 23 can slide synchronously with the other front slider 21 and the other rear slider 23 in a vehicle's longitudinal direction FR. Each middle slider 25 has a rotation supporting hole (not indicated by a reference number) in the front end and a cam hole 25b elongated in the longitudinal direction. The rotation supporting hole in the front end of the middle slider 25 accepts a rotation pin 21a of the corresponding front slider 21. The elongated cam hole 25b in the middle slider 25 accepts a cam pin 23a of the corresponding rear slider 23. The two middle sliders 25 move together with the two front sliders 21 in the vehicle's longitudinal direction FR, and move together with the two rear sliders 23 in the vehicle's longitudinal direction FR and in a vehicle's vertical direction TB depending on the positions of the cam pins 23a in the cam holes 25b. This slider mechanism allows the sunroof 30 to move between three positions: a closed position (FIG. 3A), a tilt-up position (FIG. 3B), and an open position (FIG. 3C). The sunroof 30 keeps the opening 3 closed in the closed position as illustrated in FIG. 3A, keeps the front part of the opening 3 closed and the rear part of the opening 3 open in the tilt-up position as illustrated in FIG. 3B, and keeps the opening 3 open in the open position as illustrated in FIG. 3C.

As illustrated in FIG. 1, the sunroof 30 is fixed to the two middle sliders 25. The sunroof 30 includes a laminated panel body (not indicated by a reference number) having at least a transparent glass layer and a light control panel. Without the application of a voltage, the light control panel is opaque. With the application of a voltage, the light control panel changes its transparency depending on the voltage level. The light control panel is supplied with electricity from the vehicle body 1. This power supply structure will be described later.

Each driving belt 40 is made of synthetic resin. Each driving belt 40 is elongated and its cross-sectional shape is an elongated rectangle. One side of the driving belt 40 has teeth 40a arranged one after another in the longitudinal direction. Each driving belt 40 is arranged in the corresponding belt routing path 16 of the front frame 15 and in the belt guiding path 13 of the corresponding rail member 11. The driving belt 40 is covered with a belt cover 46 in the belt routing path 16 of the front frame 15 and with belt surrounding walls (not indicated by a reference number) in the belt guiding path 13 of the rail member 11 so that the driving belt 40 does not bend (elastically deform) easily. This enables the two driving belts 40 to move in given routes when the driving belts 40 push the sunroof 30 from the front to the rear of the vehicle.

The two driving belts 40 are fixed to the two rear slider 23 at one ends (one driving belt 40 is fixed to one rear slider 23 at one end and the other driving belt 40 is fixed to the other rear slider 23 at one end). The other ends of the driving belts 40 are fixed to nothing, which means the other ends of the driving belts 40 are free ends.

The actuator 49 (see FIG. 1) is fixed generally in the middle of the front frame 15 in the vehicle's width direction. The actuator 49 includes a pair of output gears (not illustrated). The two output gears engage with the teeth 40a of the two driving belts 40. The two output gears rotate in opposite directions to each other. This enables the two driving belts 40 to move in opposite directions to each other, which moves the two rear sliders 23 synchronously in the vehicle's longitudinal direction FR.

The deflector 50 includes a deflector body 51, a pair of rocking arms 52 rotatably supported by the right and left ends of the deflector body 51. The deflector body 51 is arranged to extend in the vehicle's width direction and cover the entire front end of the opening 3 in the top panel 2 from the front. The deflector body 51 is curved in an arc shape on its front side. This prevents an outside strong wind from blowing directly into the vehicle's inside through the opening 3 when the opening 3 is open.

The two rocking arms 52 are rotatably supported by the two rail members 11. The two rocking arms 52 move the deflector body 51 freely between a standby position (FIGS. 3A and 3B) and a wind shielding position (FIG. 3C). The deflector body 51 is at a lower position than the position of the opening 3 in the top panel 2 in the standby position. The deflector body 51 projects through the opening 3 above the top panel 2 in the wind shielding position. The deflector body 51 is urged by a torsion spring 53 to the wind shielding position. The deflector body 51 is in the sliding paths of the front sliders 21. When the front sliders 21 are in the closed position in FIG. 3A or the tilt-up position in FIG. 3B, the front sliders 21 put pressure on the two rocking arms 52, so that the deflector body 51 is kept in the standby position against the spring force of the torsion spring 53. When the front sliders 21 are in the open position in FIG. 3C, the front sliders 21 put no pressure on the two rocking arms 52, so that the deflector body 51 is kept in the wind shielding position due to the spring force of the torsion spring 53.

The water receiving member 60 is arranged to extend in the vehicle's width direction and cover the entire rear end of the opening 3 from the bottom. The water receiving member 60 includes a slider part (not illustrated) slidably supported by the two rail members 11, a water receiving body 62 supported by the slider part and having a water receiving groove (not illustrated), and a pair of arms 63 fixed to the ends of the water receiving body 62 in the vehicle's width direction. The water receiving groove (not illustrated) in the water receiving body 62 includes a drain outlet 62a (see FIG. 1) right over the drain path 14 of each rail member 11. The ends of the two arms 63 are rotatably supported by the middle sliders 25. The water receiving member 60 moves following the movement of the middle sliders 25 in the vehicle's longitudinal direction FR and the movement of the rear ends of the middle sliders 25 in the vertical direction.

When the sunroof 30 is in the closed position in FIG. 3A, the water receiving body 62 of the water receiving member 60 is located along the rear end of the opening 3 to receive waterdrops or the like falling through the gap between the sunroof 30 and the top panel 2. When the sunroof 30 is in the tilt-up position in FIG. 3B, the water receiving body 62 is located along the rear end of the opening 3 to receive waterdrops or the like falling through the opening 3. When the sunroof 30 is in the open position in FIG. 3C, the water receiving body 62 is hidden in a receded position under the top panel 2. After the water receiving body 62 receives waterdrops or the like, the water goes through the drain outlets (not illustrated) and falls into the drain paths 14 of the rail members 11. The water then flows through the drain paths 14 of the rail members 11 toward the front ends or the rear ends and goes through the drain caps 18 and the drain hoses (not illustrated) to be drained to the outside.

The fixing structure of the driving belts 40 to the rear sliders 23 will now be described. As specifically illustrated in FIGS. 4 and 5, each rear slider 23 includes a resin block 26 and an insulated metal bracket 27 engaged with the resin block 26. The resin block 26 is arranged in the corresponding slider guiding path 12. The resin block 26 includes two engagement projections 26a and the metal bracket 27 includes one engagement projection 27a. The engagement projection 27a of the metal bracket 27 is arranged between the two engagement projections 26a of the resin block 26 in the vehicle's longitudinal direction FR. Each driving belt 40 has engagement holes 44 in one end to accept the engagement projections 26a and 27a. Each driving belt 40 is coupled to the corresponding rear slider 23 by fitting the engagement projections 26a and 27a of the resin block 26 and the metal bracket 27 in the engagement holes 44 in the driving belt 40.

Figure 8:
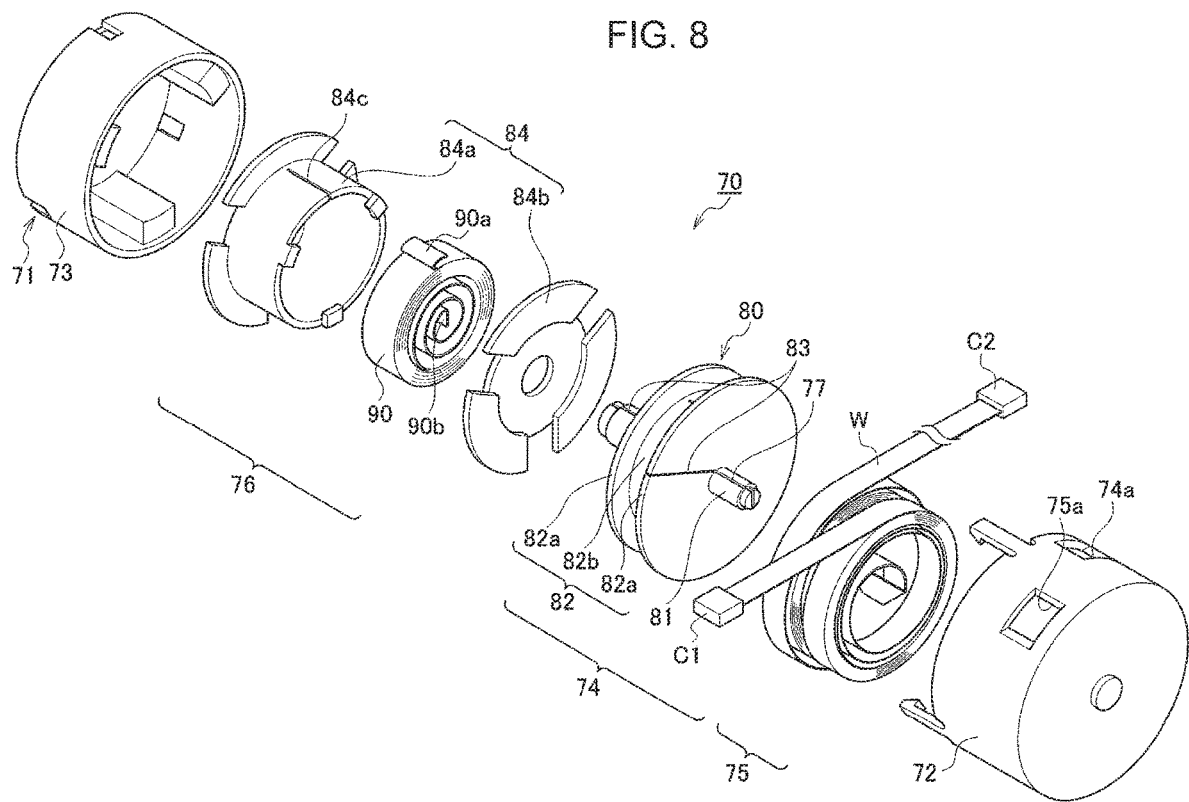
FIG. 8 is an exploded perspective view illustrating an extra part draw-in mechanism of a power supply structure for a movable body according to the first embodiment of the present invention.

The power supply structure for supplying electricity from the vehicle body 1 to the sunroof 30 will now be described. As illustrated in FIGS. 1 and 8 and other drawings, the power supply structure for a movable body includes a flat cable W placed along one rain member 11, and an extra part draw-in mechanism 70 that is arranged in some place of the routing path for the flat cable W and draws in an extra part of the flat cable W.

The flat cable W includes a connector C1 at one end and a connector C2 at the other end. The connector C1 is connected to a connector (not illustrated) on the vehicle body 1 and the connector C2 is connected to a connector (not illustrated) on the sunroof. The flat cable W is flexible and also elastic. The flat cable W recovers its original shape (a flat and liner shape) when being bent. The flat cable W is sheathed with an insulating layer and an uppermost protective layer (not illustrated).

As illustrated in FIGS. 3A to 3C, the extra part draw-in mechanism 70 is arranged at an end of one rail member 11 in the movement direction of the sliders 21, 23, and 25 (the vehicle's longitudinal direction FR). As specifically illustrated in FIGS. 8 and 9A and 9B, the extra part draw-in mechanism 70 includes a case 71, a rotary body 80 in the case 71, a spring guiding member 84 in the case 71, and a spiral spring 90 as an urging member in the spring guiding member 84.

Figure 9A:
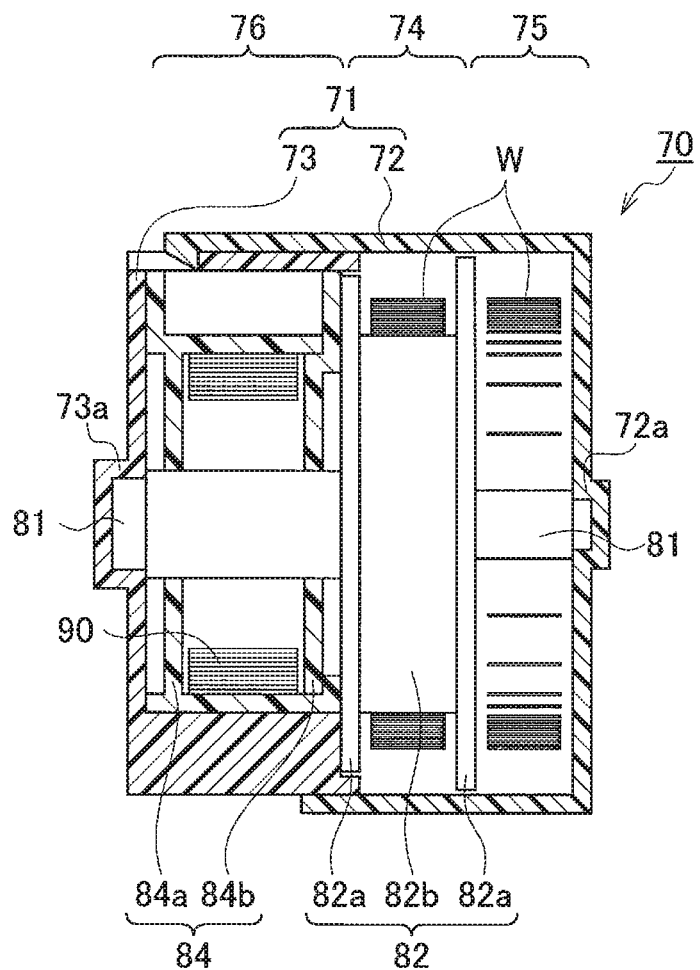
FIG. 9A is a cross-sectional view illustrating the extra part draw-in mechanism according to the first embodiment of the present invention.

The case 71 is a generally cylindrical case with both sides closed. The case 71 includes two divisible case bodies 72 and 73 joined to each other. The divisible case body 72 includes a rotation supporting part 72a and the divisible case body 73 includes a rotation supporting part 73a. The rotation supporting parts 72a and 73a rotatably support the rotary body 80. As illustrated in FIG. 9A, the case 71 is divided into three sections: an extra cable storing section 74, an anti-twist cable storing section 75, and a spring storing section 76 in the axial direction of central axes 81 described below. The case 71 has a generally equal outer diameter in the extra cable storing section 74, in the anti-twist cable storing section 75, and in the spring storing section 76.

The extra cable storing section 74 has a first cable outlet 74a of which the flat cable W coupled to the sunroof 30 is pulled out. The anti-twist cable storing section 75 has a second cable outlet 75a of which the flat cable W coupled to the fixed part (the vehicle body 1) is pulled out. The first cable outlet 74a is not aligned with the second cable outlet 75a in the axial direction of the central axes 81 described below.

The rotary body 80 is made of an integral member. The rotary body 80 includes a pair of central axes 81 supported by the rotation supporting parts 72a and 73a, and an outer circumferential winding part 82 integrated with the central axes 81. The two central axes 81 rotate together with the rotary body 80. The outer circumferential winding part 82 is arranged in the extra cable storing section 74. The outer circumferential winding part 82 includes a winding face 82b between a pair of side walls 82a. The central axes 81 project outward from the sides of the outer circumferential winding part 82, and the projected parts of the central axes 81 extend through the anti-twist cable storing section 75 and the spring storing section 76. The outer circumferential face of the central axis 81 extending through the anti-twist cable storing section 75 functions as a winding face 81a (see FIGS. 10, 12A, and 12B) for the flat cable W.

The rotary body 80 has slits 83 and 77 in the outer circumferential winding part 82 and the two central axes 81. The slit 83 is formed in the outer circumferential winding part 82 and the outer circumferential face of the central axis 81 extending through the spring storing section 76. The slit 77 is formed in the winding face 81a of the central axis 81 extending through the anti-twist cable storing section 75. As specifically illustrated in FIG. 10, the slit 77 has an opening formed in the winding face 81a and curved along the winding direction. The winding direction side of the opening of the slit 77 forms a curved face 77a continuing to the winding face 81a. A face 77b of the opening of the slit 77 on the side opposite to the winding direction side is formed so that the width of the slit 77 gradually becomes narrower toward the opening of the slit 77.

Figure 9B:
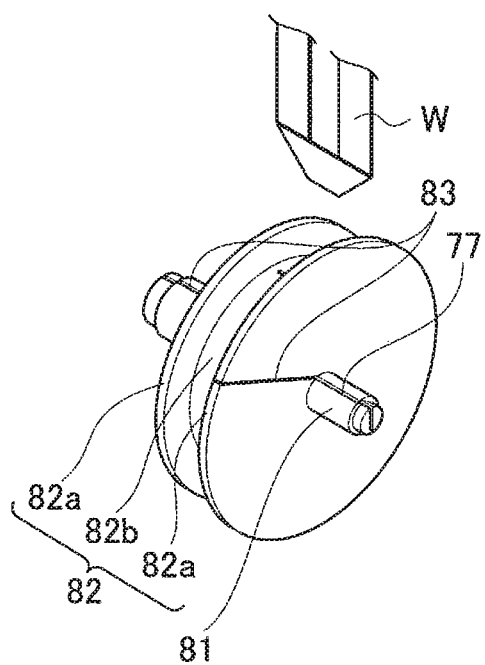
FIG. 9B is an exploded perspective view illustrating a winding direction switching portion formed in some place of a flat cable, and a slit in a central axis that accepts the switching portion according to the first embodiment of the present invention.
Figure 10:
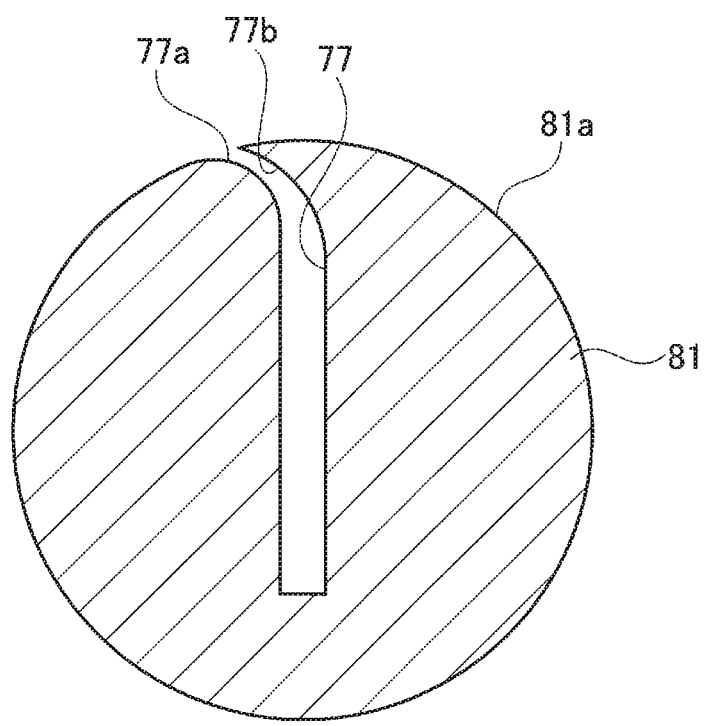
FIG. 10 is an enlarged cross-sectional view illustrating the central axis according to the first embodiment of the present invention.

The slits 83 and 77 accept a winding direction switching portion of the flat cable W (see FIG. 9B). The flat cable W is folded two times at the winding direction switching portion to be inserted in the slits 83 and 77. A part of the flat cable W to be coupled to the movable body (the sunroof 30) is inserted in the slit 83 through an opening of the winding face 82b. The part of the cable for the movable body (the sunroof 30) is set to be ready for being wound around the outer circumferential winding part 82 and pulled out of the first cable outlet 74a to the outside of the case.

Another part of the flat cable W is inserted in the slit 77 and pulled out of the opening of the slit 77 in the central axis 81. The flat cable W is then wound in the anti-twist cable storing section 75 in the direction opposite to the winding direction in the outer circumferential winding part. 82 (the winding direction of the flat cable W for the movable body (the sunroof 30)) and the end of this cable part is pulled out of the second cable outlet 75a to the outside of the case. This cable part is in a spiral firm in the anti-twist cable storing section 75 and has a length to change its spiral form (between a loose spiral form and a tight spiral form) and draw in at least an extra part of the flat cable W.

The spring guiding member 84 is arranged in the spring storing section 76. The spring guiding member 84 includes two divisible bodies 84a and 84b joined to each other. The spring guiding member 84 is fixed to the case 71.

The spring guiding member 84 keeps the shape of the spiral spring 90, and the spiral spring 90 is arranged in the spring storing section 76. An outer end 90a (see FIG. 8) of the spiral spring 90 is fixed in a slit 84c in the spring guiding member 84 and an inner end 90b (see FIG. 8) of the spiral spring 90 is fixed in the slit 83 in the central axis 81. The spiral spring 90 urges the rotary body 80 and the outer circumferential winding part 82 in the winding direction of the flat cable W for the movable body (the sunroof 30).

In the above structure, the operation of the actuator 49 moves the two driving belts 40, which moves the ends of the two driving belts 40 synchronously in the vehicle's longitudinal direction FR and changes the position of the sunroof 30 between the three positions in FIGS. 3A to 3C.

Figure 11A:
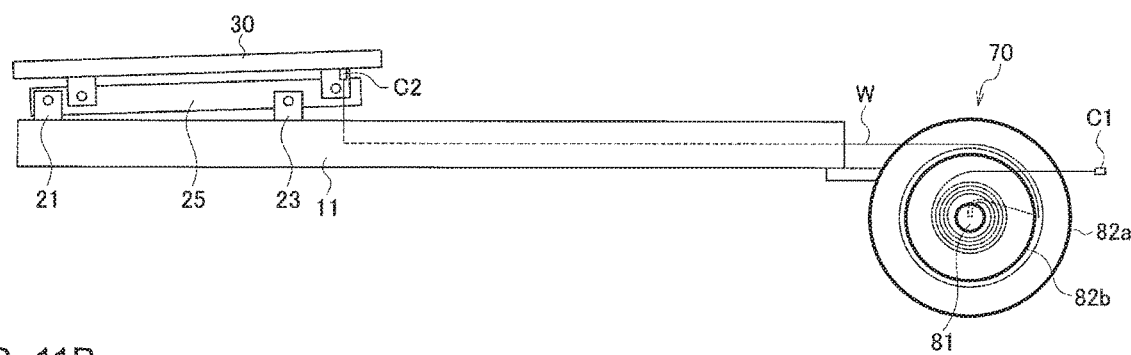
FIG. 11A is a side view illustrating the extra part draw-in mechanism with the sunroof in a closed position according to the first embodiment of the present invention.
Figure 11B:
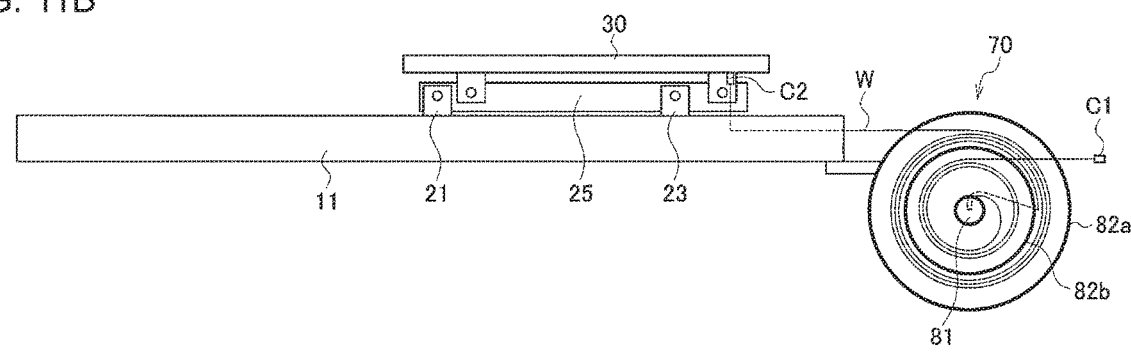
FIG. 11B is a side view illustrating the extra part draw-in mechanism with the sunroof in an open position according to the first embodiment of the present invention.

When the sunroof 30 moves in a sliding direction generating an extra part of the flat cable W (the sunroof 30 moves from the closed position in FIG. 3A to the open position in FIG. 3C, for example), the rotary body 80 rotates due to the spring force of the spiral spring 90 and the outer circumferential winding part 82 winds the generated extra part of the flat cable W (see FIG. 11B). When the sunroof 30 moves in another sliding direction necessitating an additional length of the flat cable W (the sunroof 30 moves from the open position in FIG. 3C to the closed position in FIG. 3A, for example), the rotary body 80 rotates against the spring force of the spiral spring 90 and the outer circumferential winding part 82 unwinds the necessary length of the flat cable W (see FIG. 11A). This mechanism surely draws in an extra part of the flat cable W while keeping the linear routing of the other part of the flat cable W.

While the sunroof 30 is sliding, the following occurs in the extra part draw-in mechanism 70. When the rotary body 80 rotates to wind the flat cable W for the movable body (the sunroof 30), the flat cable W decreases the number of turns and changes its shape of winding in the anti-twist cable storing section 75 (see FIG. 11B). When the rotary body 80 rotates to unwind the flat cable W for the movable body (the sunroof 30), the flat cable W increases the number of turns and changes its shape of winding in the anti-twist cable storing section 75 (see FIG. 11A). While the flat cable W of the anti-twist cable storing section 75 is changing its shape of winding like the above, the flat cable W extending out of the anti-twist cable storing section 75 is not twisted (twirled).

While the sunroof 30 is moving between the three positions, electricity is continuously supplied from a power source on the vehicle body 1 to the sunroof 30 through the flat cable W.

The behavior of the flat cable W in the anti-twist cable storing section 75 during the winding or pull-out of the flat cable W will now be described in detail.

During the winding or pull-out of the flat cable W, the length of the flat cable W in the anti-twist cable storing section 75 changes, which changes the shape of winding of the flat cable W in the anti-twist cable storing section 75.

Figure 12A:
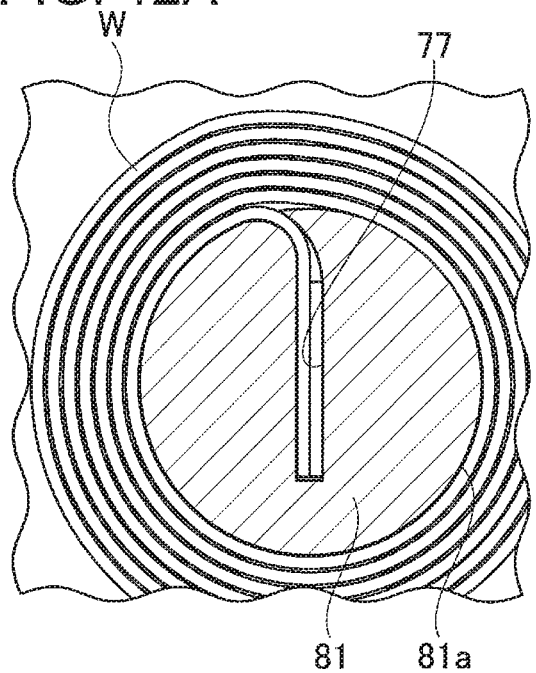
FIG. 12A is an enlarged view illustrating an essential part of the flat cable being tightly wound according to the first embodiment of the present invention.

When the flat cable W has a shape of winding with a larger number of turns in the anti-twist cable storing section 75 (see FIG. 11A), the flat cable W is layered on the winding face 81a of the central axis 81 as illustrated in FIG. 12A. Since the opening of the slit 77 is curved, the wound and layered flat cable W makes no bump and thus causes no stress concentration around the opening of the slit 77. The flat cable around the opening of the slit 77 thus does not break after the winding and pull-out of the flat cable W is repeated many times.

Figure 12B:
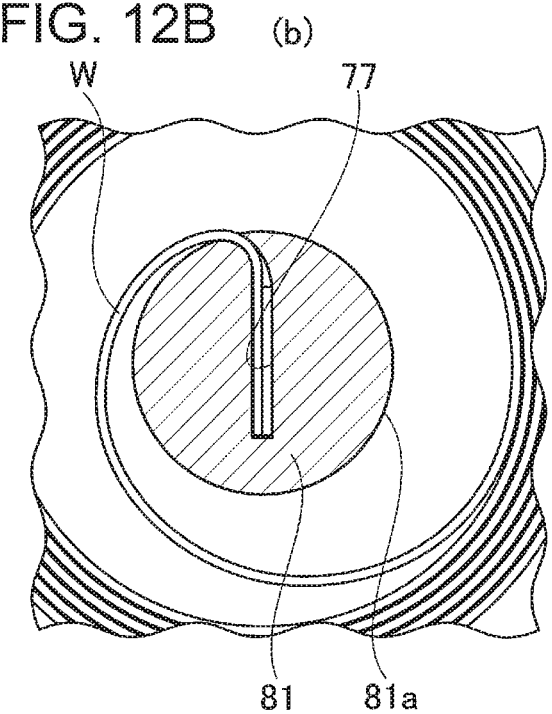
FIG. 12B is an enlarged view illustrating an essential part of the flat cable being loosely wound according to the first embodiment of the present invention.
Figure 12C:
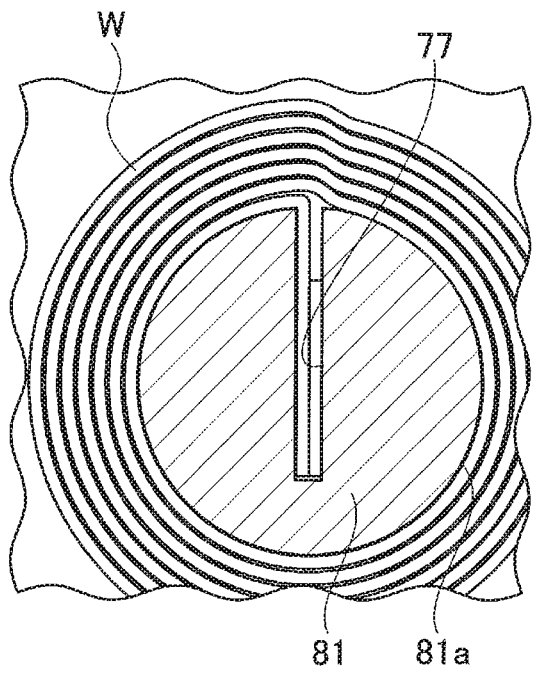
FIG. 12C is an enlarged view illustrating an essential part of the flat cable being tightly wound as a comparative example.

If the slit 77 extends in the radial direction of the central axis 81 and has a linear opening as illustrated in a comparative example in FIG. 12C, the layered flat cable W makes a bump and thus causes stress concentration around the opening of the slit 77. The flat cable W around the opening of the slit 77 thus may break after the winding and pull-out of the flat cable W is repeated many times.

When the flat cable W has a shape of winding with a smaller number of turns in the anti-twist cable storing section 75 (see FIG. 11B), the flat cable W is loosely wound around the central axis 81 without being in contact with the winding face 81a and the part of the flat cable W led out of the slit 77 moves as illustrated in FIG. 12B. Since the opening of the slit 77 is curved, the flat cable W comes into contact with the curved portion at the opening of the slit 77 but not with any edge, which causes no stress concentration. The flat cable around the opening of the slit 77 thus does not break after the winding and pull-out of the flat cable W is repeated many times.

Figure 12D:
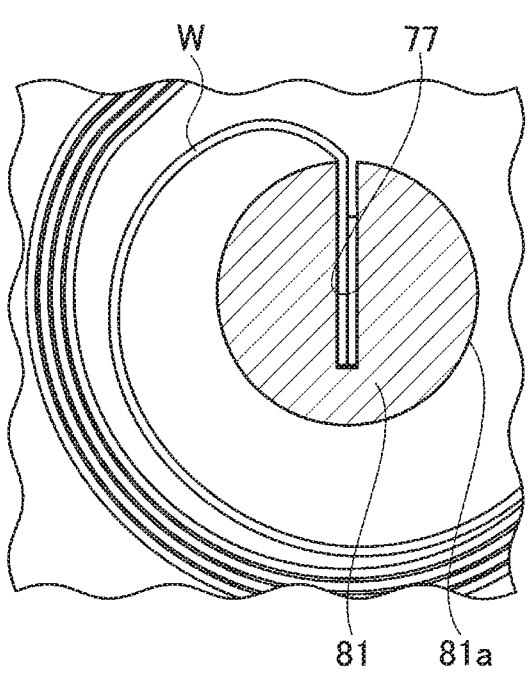
FIG. 12D is an enlarged view illustrating an essential part of the flat cable being loosely wound as a comparative example.

If the slit 77 extends in the radial direction of the central axis 81 and has a linear opening as illustrated in a comparative example in FIG. 12D, the part of the flat cable W led out of the slit 77 moves and comes into contact with an edge, which causes stress concentration. The flat cable W around the opening of the slit 77 thus may break after the winding and pull-out of the flat cable W is repeated many times.

As described above, the power supply structure for a movable body that supplies electricity from the vehicle body 1 as the fixed part to the sunroof 30 as the movable body includes the extra part draw-in mechanism 70 that draws in an extra part of the flat cable W. The extra part draw-in mechanism 70 includes the central axis 81 having the winding face 81a for the flat cable W on its outer circumferential face, the rotary body 80 arranged around the central axis 81 and rotatably supported with the central axis 81 at its center, the spiral spring (urging member) 90 that urges the rotary body 80 in the winding direction of the flat cable W, and the slit 77 having an opening in the winding face 81a of the central axis 81 to accept and hold the flat cable W, the opening of the slit 77 in the winding face 81a being curved along the winding direction.

When the movable body (the sunroof 30) moves in the direction for pulling out the flat cable W the rotary body 80 rotates against the urging force of the spiral spring (urging member) 90 to unwind the flat cable W being wound. When the movable body (the sunroof 30) moves in the direction for winding the flat cable W, the rotary body 80 rotates due to the urging force of the spiral spring (urging member) 90 to wind the flat cable W and draw in an extra part of the flat cable W.

When the extra part draw-in mechanism 70 is fixed to the fixed part (the vehicle body 1), for example, the movable body (the sunroof 30) needs no additional component, which makes the installation easy. The extra part draw-in mechanism 70 includes the rotary body 80 that winds the flat cable W, and the spiral spring 90 as an urging member that urges the rotary body 80. Both of rotary body 80 and the spiral spring 90 have the centers of rotation at their centers, which makes the structure compact.

When the flat cable W is wound on the winding face 81a of the central axis 81 as illustrated in FIG. 12A, the flat cable W is layered at the opening of the slit 77, however, the layered flat cable W makes no bump and thus causes no stress concentration around the opening of the slit 77. When the flat cable W is wound loosely around the central axis 81 without being in contact with the winding face 81a as illustrated in FIG. 12B, the part of the flat cable W led out of the slit 77 moves and comes into contact with the curved portion at the opening of the slit 77 but not with any edge. Again, no stress concentration is caused around the opening of the slit 77. The flat cable W around the opening of the slit 77 thus does not break after the winding and pull-out of the flat cable W is repeated many times.

The extra part draw-in mechanism 70 has a simple structure including the rotary body 80, and the spiral spring 90 that urges the rotary body 80. Accordingly, the present invention provides the power supply structure for a movable body that is easy to install and has a very simple structure.

The rotary body 80 includes the outer circumferential winding part 82 having the winding face 82b for the flat cable W on its outer circumferential face. An area around the outer circumferential winding part 82 functions as the extra cable storing section 74, and an area around the central axis 81 functions as the anti-twist cable storing section 75. The part of the flat cable W to be coupled to the movable body (the sunroof 30) is fixed to the outer circumferential winding part 82, and the part of the flat cable W to be coupled to the fixed part (the vehicle body 1) is fixed in the slit 77 in the central axis 81 with the winding direction opposite to the winding direction in the outer circumferential winding part 82.

While the sunroof 30 is sliding and the flat cable W is changing its shape of winding in the anti-twist cable storing section 75, the flat cable W extending out of the anti-twist cable storing section 75 is not twisted (twirled). This prevents troubles such as the breakage and disconnection of the flat cable W due to the twist and ensures the durability and reliability of the flat cable W.

The extra cable storing section 74 and the anti-twist cable storing section 75 are arranged to be adjacent to each other in the axial direction of the central axes 81. The extra cable storing section 74 stores the flat cable W for the movable body (the sunroof 30) around the outer circumferential winding part 82 and the anti-twist cable storing section 75 stores the flat cable W for the fixed part (the vehicle body 1) being wound. This arrangement of the two sections makes the extra part draw-in mechanism 70 compact.

The extra part draw-in mechanism 70 includes the rotary body 80, the case 71 that stores the rotary body 80 and has the rotation supporting parts 72a and 73a for rotatably supporting the rotary body 80, the spring guiding member 84, and the spiral spring (spring) 90 as an urging member in the case 71. The extra part draw-in mechanism 70 thus includes only a small number of components in the case 71. Moreover, the spring guiding member 84 may be omitted. Without the spring guiding member 84, the extra part draw-in mechanism 70 includes fewer components.

The flat cable W is placed along one rail member 11 and the extra part draw-in mechanism 70 is arranged at an end of the rail member 11 in the movement direction of the sliders 21, 23, and 25. Since the flat cable W is placed in the space of the rail member 11 in which the sliders 21, 23, and 25 move; no additional space is needed for placing the flat cable W. The extra part draw-in mechanism 70 can be arranged at the end of the rail member 11 as a part of the rail member 11. In this case, when the rail member 11 is installed on the vehicle body 1, for example, the extra part draw-in mechanism 70 is also installed on the vehicle body 1.

Modified Embodiment of Extra Part Draw-in Mechanism

FIGS. 13 to 16B illustrate an extra part draw-in mechanism 70A according to the modified embodiment. As illustrate in FIG. 13, the extra part draw-in mechanism 70A of the modified embodiment is arranged at an end of one rail member 11 as in the first embodiment. As specifically illustrated in FIGS. 14 and 15A and 15B, the extra part draw-in mechanism 70A includes a case 71, a rotary body 80A in the case 71, and a spiral spring 90 as an urging member in the case 71.

Figure 15A:
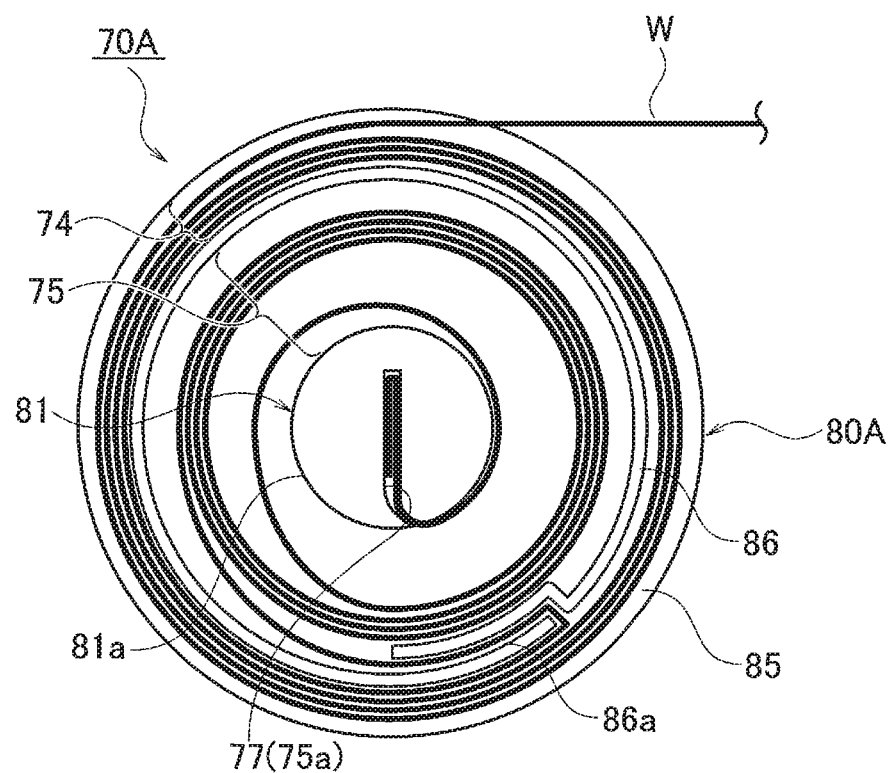
FIG. 15A is a side view illustrating the extra part draw-in mechanism without one divisible case body according to the modified embodiment of the first embodiment.
Figure 15B:
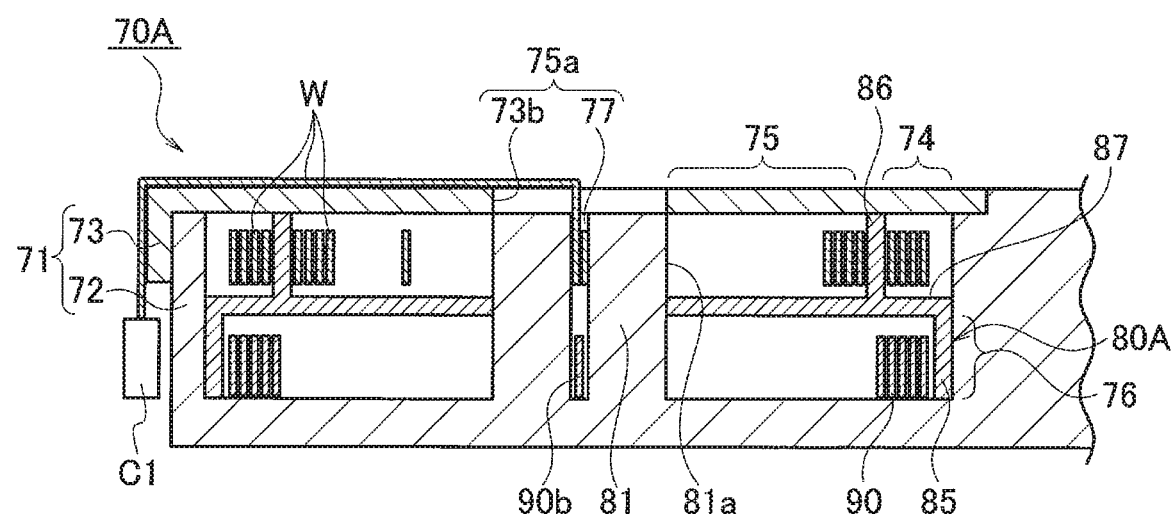
FIG. 15B is a vertical cross-sectional view illustrating the extra part draw-in mechanism according to the modified embodiment of the first embodiment.

The case 71 is a generally cylindrical case with both sides closed. The case 71 includes two divisible case bodies 72 and 73 joined to each other. The divisible case body 72 includes a central axis 81 that rotatably supports the rotary body 80A. The central axis 81 is separate from the rotary body 80A and does not rotate together with the rotary body 80A. The divisible case body 73 has a rotation supporting hole 73b that accepts and supports the tip of the central axis 81. As illustrated in FIGS. 15A and 15B, the case 71 is divided into two sections: a cable storing section (an extra cable storing section 74 and an anti-twist cable storing section 75) and a spring storing section 76 in the axial direction of the central axis 81. The extra cable storing section 74 and the anti-twist cable storing section 75 are arranged at the same level in the axial direction of the central axis 81, and the extra cable storing section 74 surrounds the anti-twist cable storing section 75.

The central axis 81 has a winding face 81.a for the flat cable W on its outer circumferential face. The central axis 81 has a slit 77. The slit 77 has an opening in the winding face 81a of the central axis 81. The opening of the slit 77 in the winding face 81a is curved along the winding direction as in the first embodiment. The winding direction side of the slit 77 forms a continuous R curve together with the winding face 81a as in the first embodiment.

The extra cable storing section 74 has a first cable outlet 74a of which the flat cable W coupled to the sunroof 30 is pulled out. The anti-twist cable storing section 75 has a second cable outlet 75a of which the flat cable W coupled to the fixed part (the vehicle body 1) is pulled out.

The first cable outlet 74a is formed in the outer wall of the divisible case body 72. The second cable outlet 75a is made by the slit 77 in the central axis 81 of the divisible case body 73 and the rotation supporting hole 73b.

The rotary body 80A is made of an integral member. The rotary body 80A includes a rotation guiding circumferential wall 85 that has a diameter slightly smaller than the inner diameter of the divisible case body 72, an outer circumferential winding part 86 arranged to be shifted with respect to the rotation guiding circumferential wall 85 in the axial direction of the central axis 81, a side wall 87 that couples the rotation guiding circumferential wall 85 to the outer circumferential winding part 86, and a rotation guiding hole 88 that is open in the center of the side wall 87 and accepts the central axis 81. The inner wall of the divisible case body 72 guides the rotation guiding circumferential wall 85 and the central axis 81 of the divisible case body 72 guides the rotation guiding hole 88, so that the rotary body 80A is rotatably supported in the case 71 (the divisible case bodies 72 and 73).

The outer circumferential winding part 86 of the rotary body 80A has a slit 86a connecting the inner anti-twist cable storing section 75 and the outer extra cable storing section 74.

A part of the flat cable W to be coupled the movable body (the sunroof) is stored in the extra cable storing section 74 and led into the slit 86a. The part of the flat cable W in the slit 86a is fixed to the outer circumferential winding part 86. The part of the cable for the movable body (the sunroof) is set to be ready for being wound around the outer circumferential winding part 86 and pulled out of the first cable outlet 74a to the outside of the case.

After being inserted and fixed in the slit 86a, the flat cable W is led from the slit 86a into the anti-twist cable storing section 75. The flat cable W is then wound in the anti-twist cable storing section 75 in the direction opposite to the winding direction in the extra cable storing section 74 (the winding direction of the flat cable W for the movable body (the sunroof)) and the end of this cable part is pulled out of the second cable outlet 75a to the outside of the case. The second cable outlet 75a is made by the slit 77 in the central axis 81 and the rotation supporting hole 73b.

This cable part is in a spiral form in the anti-twist cable storing section 75 and has a length to change its spiral form (between a loose spiral form and a tight spiral form) and draw in at least an extra part of the flat cable W.

The spiral spring 90 is arranged in the spring storing section 76. An outer end 90a (see FIG. 14) of the spiral spring 90 is fixed to the rotary body 80A and an inner end 90b (see FIG. 14) of the spiral spring 90 is fixed to the central axis 81. The spiral spring 90 urges the rotary body 80A and the outer circumferential winding part 86 in the winding direction of the flat cable W for the movable body (the sunroof 30).

Figure 13:
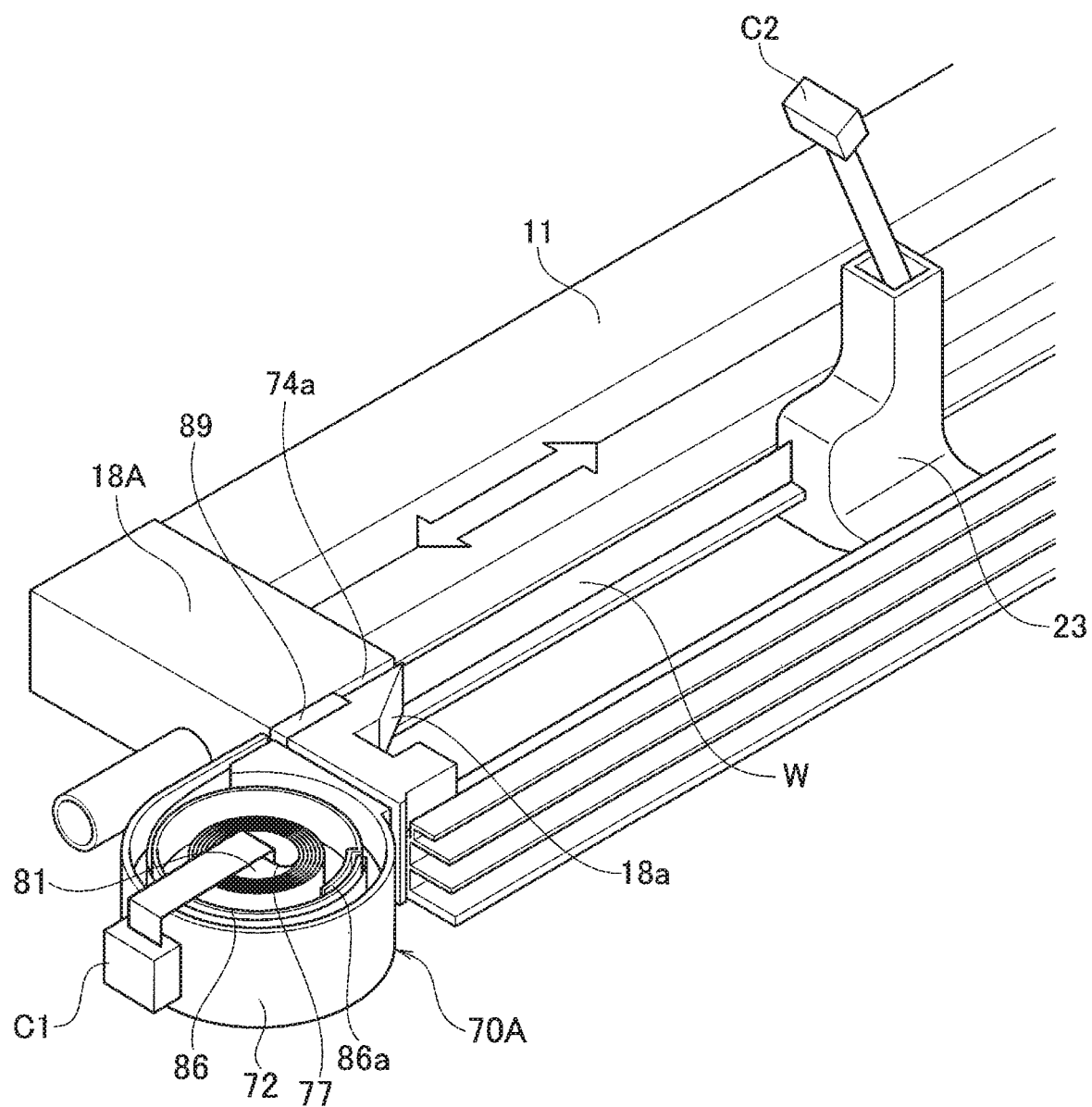
FIG. 13 is a perspective view illustrating e installation position of an extra part draw-in mechanism according to a modified embodiment of the first embodiment.
Figure 16A:
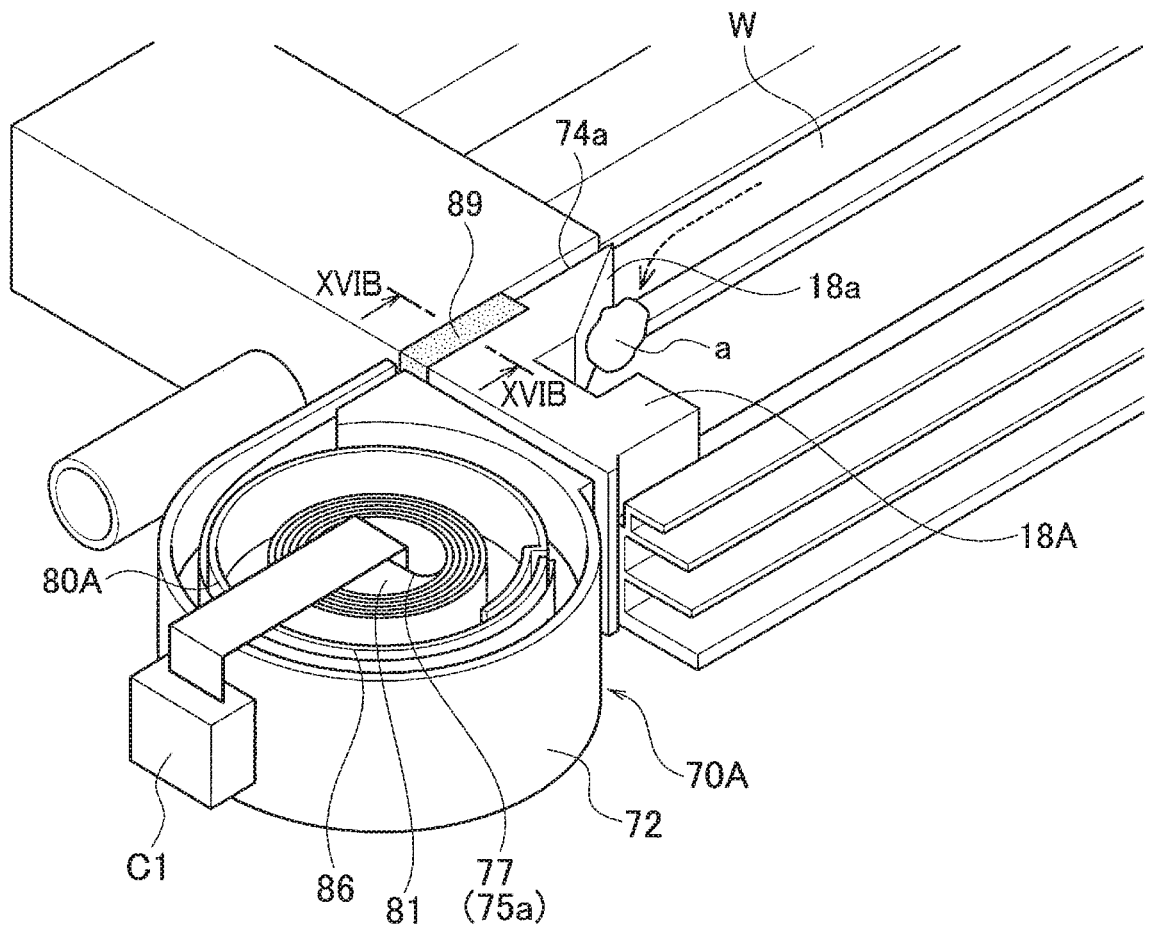
FIG. 16A is a perspective view illustrating an area around a first cable outlet in the case.
Figure 16B:
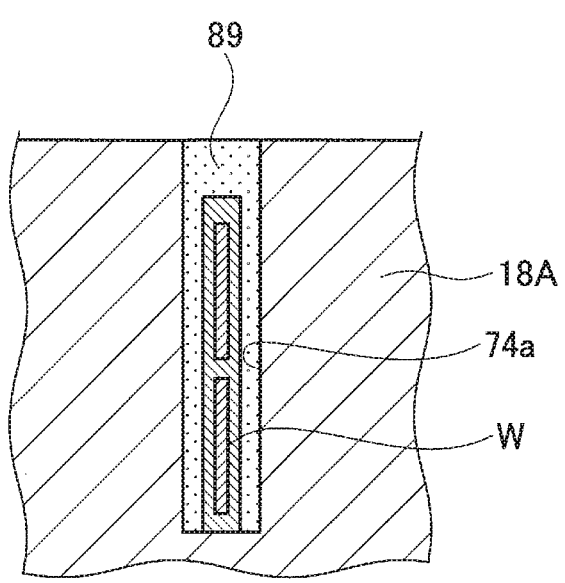
FIG. 16B is a cross-sectional view taken along the line XVIB-XVIB in FIG. 16A.
Figure 17:
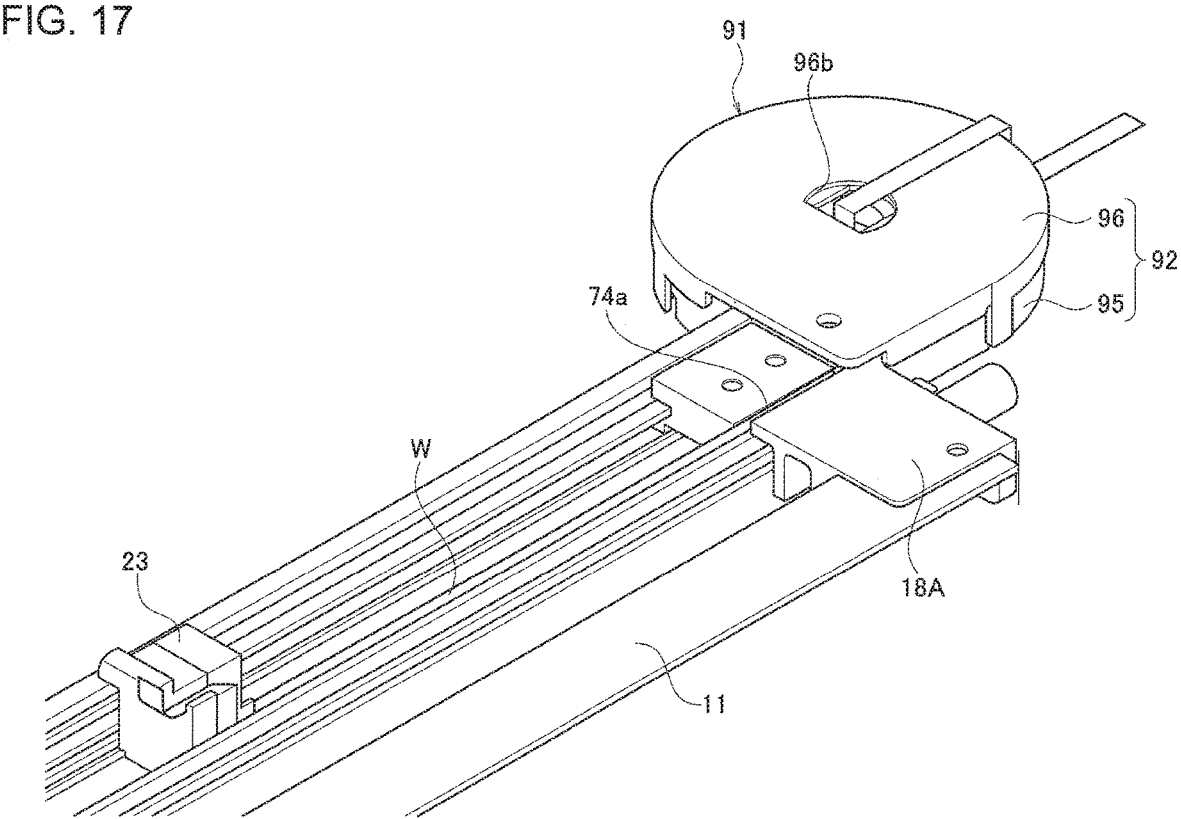
FIG. 17 is a perspective view illustrating the installation position of an extra part draw-in mechanism according to a second embodiment of the present invention.
Figure 18:
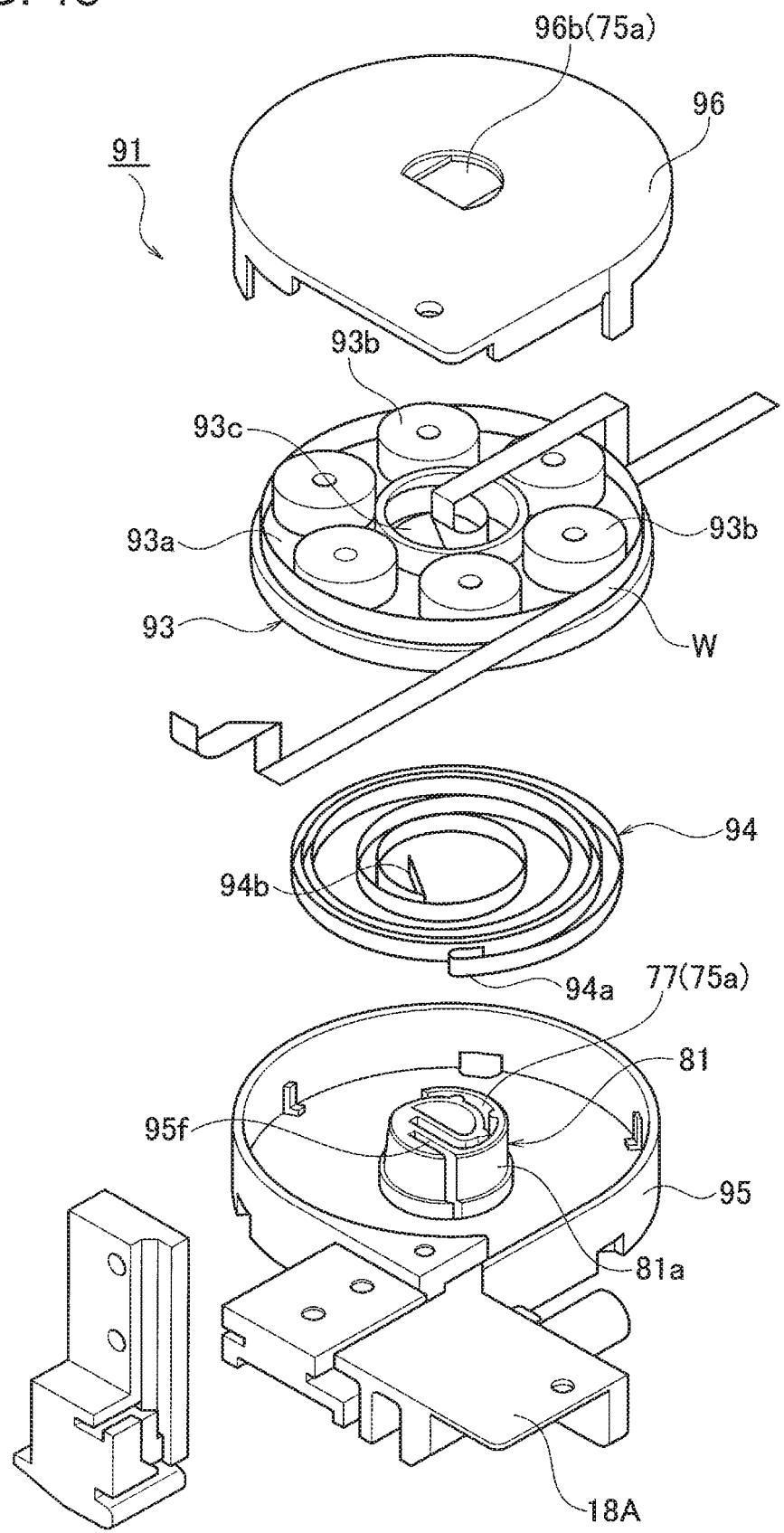
FIG. 18 is an exploded perspective view illustrating the extra part draw-in mechanism according to the second embodiment of the present invention.

As illustrated in FIGS. 13 and 16A and 16B, a drain cap 18A is integrated with the divisible case body 72. The first cable outlet 74a extends through the drain cap 18A and is open to the rail member 11. The first cable outlet 74a through the drain cap 18A forms a tapered part 18a at its tip. The first cable outlet 74a through the drain cap 18A is provided with a wiping member (sponge member) 89. The flat cable W goes into the case 71 of the extra part draw-in mechanism 70A while being in contact with the tapered part 18a and the wiping member 89. Water, dust, and the like on the flat cable W is scraped by the tapered part 18a and wiped by the wiping member 89. This prevents the entry of water, dust a (see FIG. 16A), and the like on the flat cable W into the case 71, which makes the structure water-proof and dust-proof.

When the extra part draw-in mechanism 70A of this modified embodiment is fixed to the fixed part (the vehicle body 1) as in the above embodiment, for example, the movable body (the sunroof) needs no additional component, which makes the installation easy. The extra part draw-in mechanism 70A includes the rotary body 80A that winds the flat cable W, and the spiral spring 90 as an urging member that urges the rotary body 80A, and the anti-twist cable storing section 75 that winds the flat cable W in the direction opposite to the winding direction of the rotary body 80A. All of rotary body 80A, the spiral spring 90 and the anti-twist cable storing section 75 have the centers of rotation at their centers, which makes the structure compact.

Since the slit 77 has the opening curved along the cable winding direction, the flat cable W around the opening of the slit 77 does not break after the winding and pull-out of the flat cable W is repeated many times as in the first embodiment.

In this modified embodiment, the extra cable storing section 74 for storing an extra part of the flat cable W and the anti-twist cable storing section 75 for storing the flat cable W to prevent the twist of the flat cable W are arranged at the same level in the axial direction of the rotary body 80A, and the extra cable storing section 74 surrounds the anti-twist cable storing section 75. This arrangement shortens the length of the extra part draw-in mechanism 70A in the thickness direction (in the axial direction of the rotary body 80A) compared to the first embodiment.

Second Embodiment

FIGS. 17 to 19C illustrate an extra part draw-in mechanism 91 according to a second embodiment. As illustrate in FIG. 17, the extra part draw-in mechanism 91 of the second embodiment is arranged at an end of one rail member 11 as in the first embodiment. As specifically illustrated in FIGS. 18 and 19A to 19C, the extra part draw-in mechanism 91 includes a case 92, a rotary body 93 in the case 92, and a spiral spring 94 as an urging member in the case 92.

The case 92 is a generally cylindrical case with both sides closed. The case 92 includes two divisible case bodies 95 and 96 joined to each other. The divisible case body 95 includes a central axis 81 that rotatably supports the rotary body 93. The central axis 81 is separate from the rotary body 80A and does not rotate together with the rotary body 80A.

The central axis 81 has a winding face 81a for the flat cable W on its outer circumferential face. The central axis 81 has a slit 77. The slit 77 has an opening in the winding face 81a of the central axis 81. The opening of the slit 77 in the winding face 81a is curved along the winding direction as in the first embodiment. The winding direction side of the slit 77 forms a continuous R curve together with the winding face 81a as in the first embodiment. The central axis 81 also has a spring engagement groove 95f. The divisible case body 96 has a rotation supporting hole 96b that accepts and supports the tip of the central axis 81.

The divisible case body 95 has a first cable outlet 74a in the outer circumferential side. The flat cable W coupled to the sunroof 30 is pulled out of the first cable outlet 74a. The divisible case bodies 95 and 96 have a second cable outlet 75a of which the flat cable W coupled to the fixed part (the vehicle body 1) is pulled out. The second cable outlet 75a is made by the slit 77 in the central axis 81 of the divisible case body 95 and the rotation supporting hole 96b in the divisible case body 96.

The rotary body 93 is made of an integral member. The rotary body 93 includes a disc plate 93a, a plurality of rollers 93b arranged on the disc plate 93a and spaced from each other in the circumferential direction, and a rotation guiding hole 93c that is open in the center of the disc plate 93a and accepts the central axis 81. The central axis 81 of the divisible case body 95 guides the rotation guiding hole 93c, so that the rotary body 93 is rotatably supported in the case 92 (the divisible case bodies 95 and 96) to be able to rotate smoothly.

The cable for the movable body (the sunroof) goes into the case 92 through the first cable outlet 74a. The cable then goes along the outer sides of the rollers 93b and the inner sides of the rollers 93b, and goes through the second cable outlet 75a (the slit 77 in the central axis 81 and the rotation supporting hole 96b) to the outside of the case.

An outer end 94a (see FIG. 18) of the spiral spring 94 is fixed to one of the rollers 93b of the rotary body 93 and an inner end 94b (see FIG. 18) of the spiral spring 94 is fixed to the central axis 81. The spiral spring 94 urges the rotary body 93 in the winding direction of the flat cable W for the movable body (the sunroof).

Figure 19A:
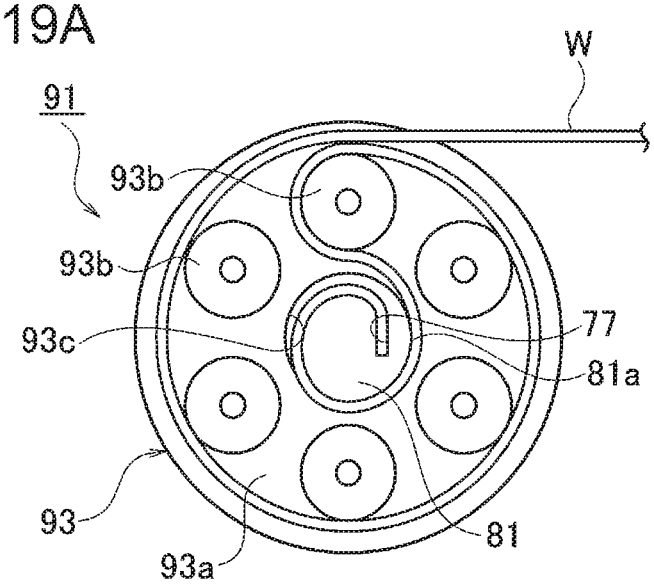
FIG. 19A is a schematic view illustrating the process of winding the flat cable to draw in an extra part of the flat cable at a first step.
Figure 19B:
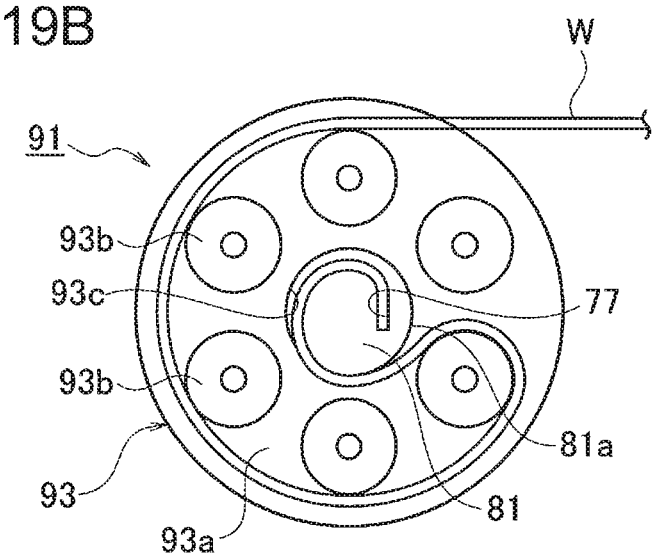
FIG. 19B is a schematic view illustrating the process of winding the flat cable to draw in the extra part of the flat cable at a second step.
Figure 19C:
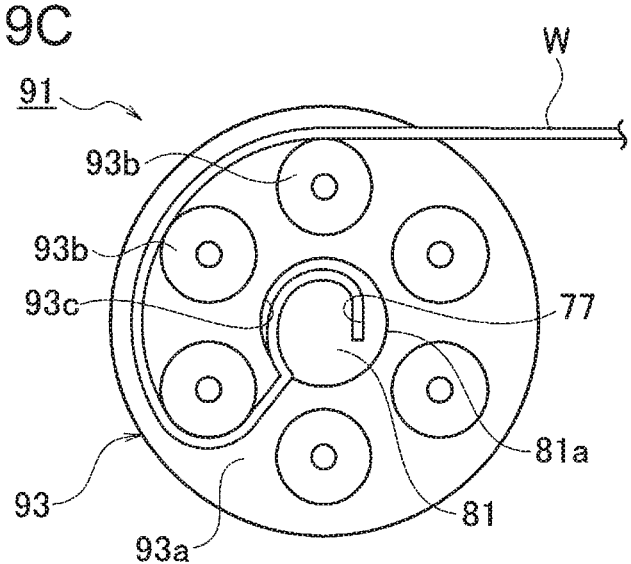
FIG. 19C is a schematic view illustrating the process of winding the flat cable to draw in the extra part of the flat cable at a third step.
Figure 20:
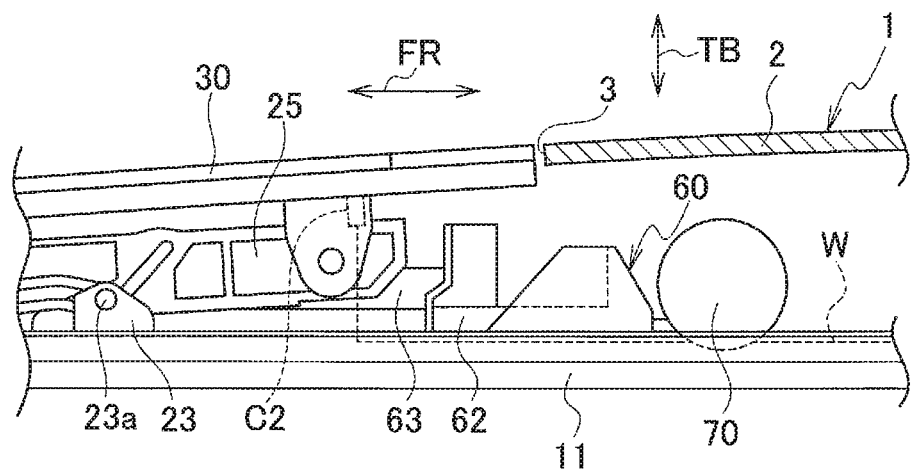
FIG. 20 is a side view illustrating the installation position of an extra part draw-in mechanism according to a third embodiment of the present invention.

When the movable body (sunroof) moves in the direction for pulling out the flat cable W at the position in FIG. 19A, the rotary body 93 rotates against the spring force of the spiral spring 94 to unwind the flat cable W. The state of the flat cable W changes from FIG. 19A to FIG. 19C via FIG. 19B. When the movable body (sunroof) moves in the direction for winding the flat cable W at the position in FIG. 19C, the rotary body 93 rotates due to the spring force of the spiral spring 94 to wind the flat cable W. The state of the flat cable W changes from FIG. 19C to FIG. 19A via FIG. 19B.

When the extra part draw-in mechanism 91 of the second embodiment is fixed to the fixed part (the vehicle body) as in the first embodiment, for example, the movable body (the sunroof) needs no additional component, which makes the installation easy. The extra part draw-in mechanism 91 includes the rotary body 93 that winds the flat cable W and has the plurality of rollers 93b in the circumferential direction, and the spiral spring 94 as an urging member that urges the rotary body 93. Both of the rotary body 93 and the spiral spring 94 have the centers of rotation at their centers, which makes the structure compact.

Since the slit 77 has the opening curved along the cable winding direction, the flat cable W around the opening of the slit 77 does not break after the winding and pull-out of the flat cable W is repeated many times as in the first embodiment.

Third Embodiment

FIGS. 20 and 21A to 21C illustrate a third embodiment of the present invention. Different from the first embodiment, an extra part draw-in mechanism 70 is fixed to a movable body or a sunroof 30 in this third embodiment. Specifically, the extra part draw-in mechanism 70 is supported by a water receiving body 62 of a water receiving member 60. The water receiving member 60 is rotatably supported by middle sliders 25. The extra part draw-in mechanism 70 moves following the movement of the middle sliders 25 in the vehicle's longitudinal direction FR and moves (rocks) following the movement of the rear ends of the middle sliders 25 in the vertical direction.

The extra part draw-in mechanism 70 has a similar structure to that of the first embodiment except that the flat cable W wound in the anti-twist cable storing section is led to the sunroof 30. The flat cable W wound around a winding part is placed along one rail member 11 and led to the vehicle body through the rear end of the rail member 11. The flat cable W extending to the movable body or the sunroof 30 is stored in the anti-twist cable storing section and the flat cable W extending to the fixed part or the vehicle body is stored in the winding part. The cable outlets for the two parts of the flat cable W are opposite to those in the first embodiment.

Since the third embodiment has the same structure as that of the first embodiment except for the characteristic described above, the further detailed description of the third embodiment is omitted to avoid redundancy. The same structural elements as those of the first embodiment are provided with the same reference numbers for clarity in FIGS. 20 and 21A to 21C.

Figure 21A:
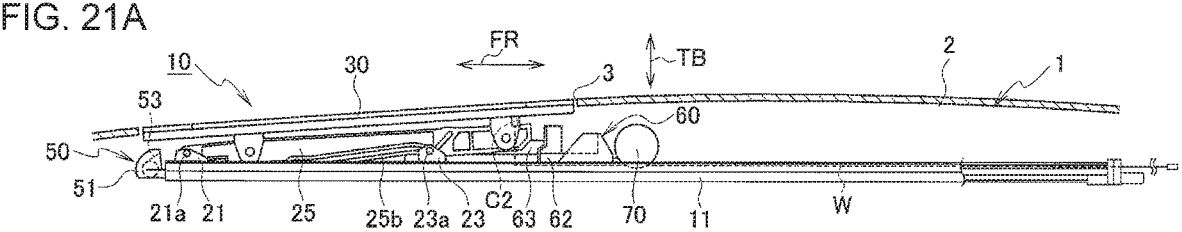
FIG. 21A is a schematic side view illustrating a sunroof in a closed position according to the third embodiment of the present invention.
Figure 21B:
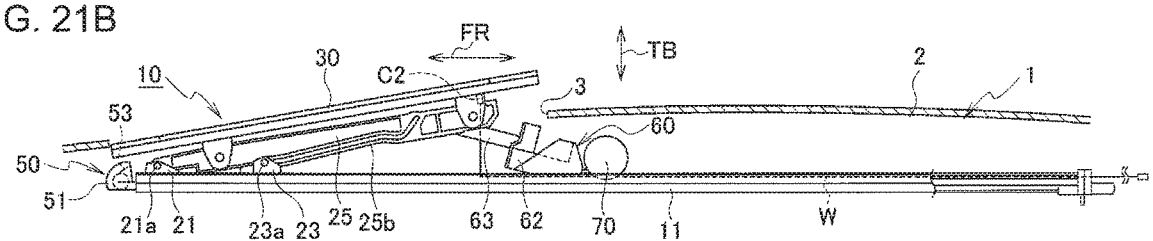
FIG. 21B is a schematic side view illustrating the sunroof in a tilt-up position according to the third embodiment of the present invention.
Figure 21C:
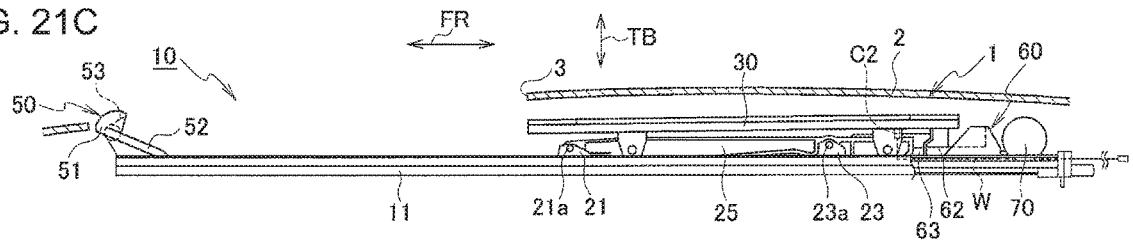
FIG. 21C is a schematic side view of the sunroof in an open position according to the third embodiment of the present invention.
Figure 22A:
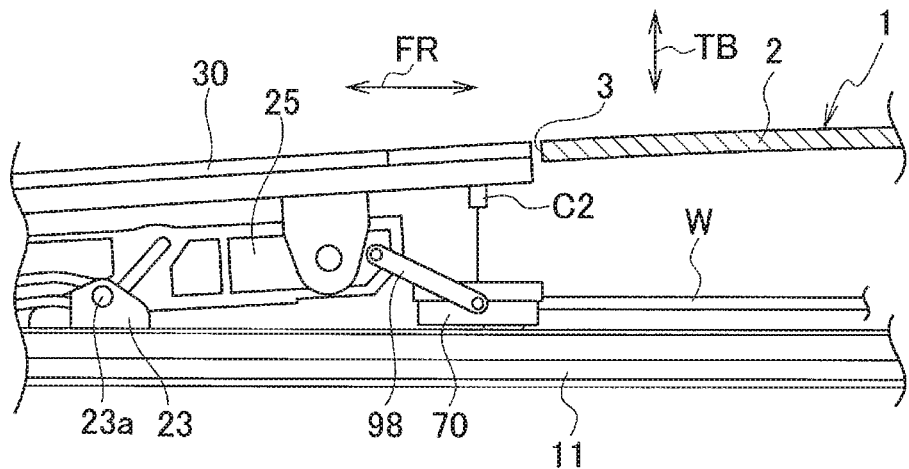
FIG. 22A is a side view illustrating the installation position of an extra part draw-in mechanism according to a fourth embodiment of the present invention.
Figure 22B:
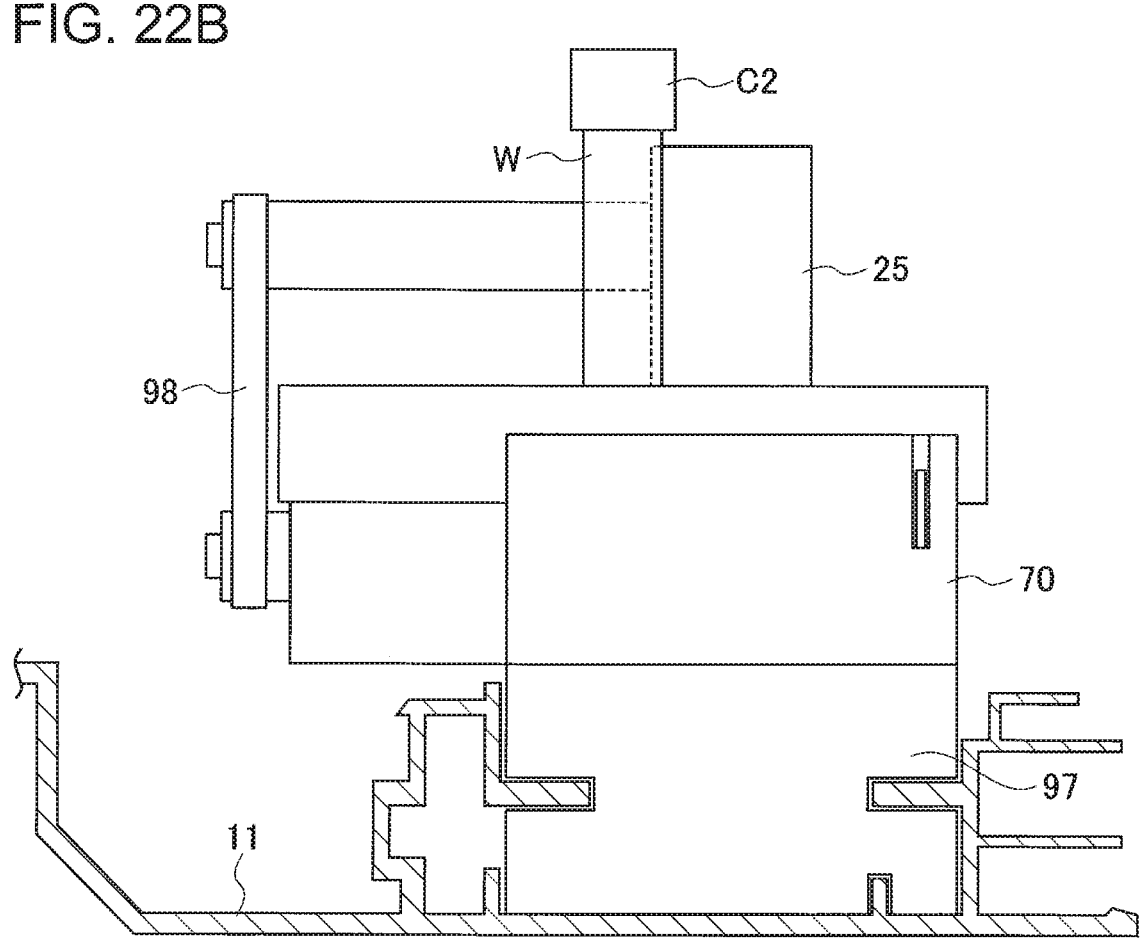
FIG. 22B is a rear view illustrating the installed extra part draw-in mechanism viewed from the rear side of the vehicle body according to the fourth embodiment of the present invention.

According to the third embodiment, electricity is continuously supplied from a power source on the vehicle body to the sunroof 30 through the flat cable W while the sunroof 30 is moving between the three positions in FIGS. 21A to 21C.

According to the third embodiment, the power supply structure for a movable body is also easy to install and has a very simple structure since the extra part draw-in mechanism 70 of the third embodiment is similar to that of the first embodiment.

According to the third embodiment, the extra part draw-in mechanism 70 is provided on the movable body or the sunroof 30, which eliminates the necessity for sparing a space for the extra part draw-in mechanism 70 at an end of one rail member 11 and makes the vehicle body compact.

Figure 14:
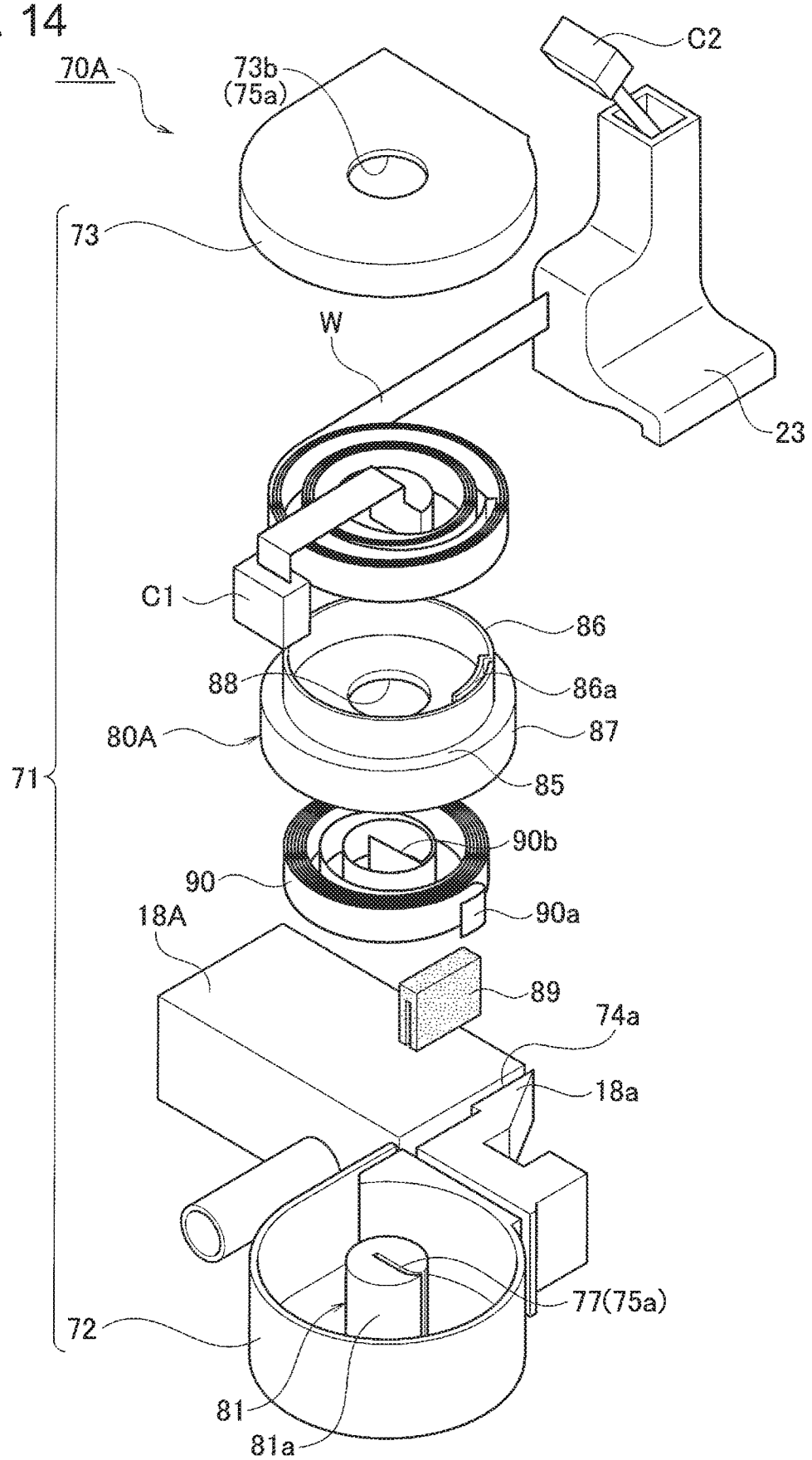
FIG. 14 is an exploded perspective view illustrating the extra part draw-in mechanism according to the modified embodiment of the first embodiment.

The extra part draw-in mechanism of this embodiment may be replaced with the extra part draw-in mechanism 70A of the modified embodiment of the first embodiment (see FIG. 14). The extra part draw-in mechanism of this embodiment may be replaced with the extra part draw-in mechanism 91 of the second embodiment (see FIG. 18).

Fourth Embodiment

FIGS. 22A and 22B and 23A to 23C illustrate a fourth embodiment of the present invention. In this fourth embodiment, an extra part draw-in mechanism 70 is fixed to a movable body or a sunroof 30 as in the third embodiment. Specifically, the extra part draw-in mechanism 70 is horizontally arranged and has a sliding part 97 below. The sliding part 97 is slidably arranged in one rail member 11. The extra part draw-in mechanism 70 is supported by one middle slider 25 via a linking member 98. The linking member 98 is rotatably supported by the extra part draw-in mechanism 70 and the middle slider 25 on its ends.

The extra part draw-in mechanism 70 moves on the rail member 11 following the movement of the middle slider 25 in the vehicle's longitudinal direction FR. When the rear end of the middle slider 25 vertically moves, the linking member 98 moves (rocks), however, the extra part draw-in mechanism 70 does not move (rock).

Since the fourth embodiment has the same structure as that of the third embodiment except for the characteristic described above, the further detailed description of the fourth embodiment is omitted to avoid redundancy. The same structural elements as those of the third embodiment are provided with the same reference numbers for clarity in FIGS. 22A and 22B and 23A to 23C.

Figure 23A:
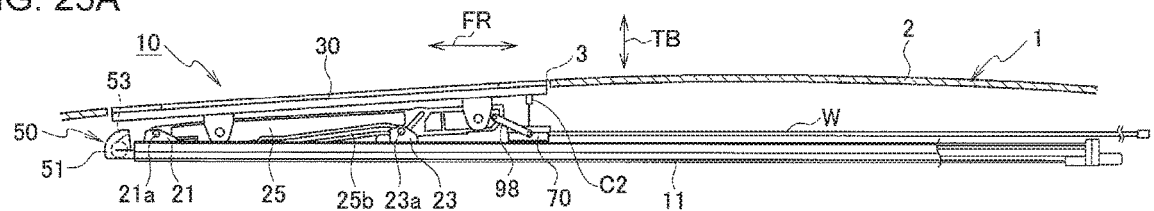
FIG. 23A is a schematic side view illustrating a sunroof in a closed position according to the fourth embodiment of the present invention.
Figure 23B:
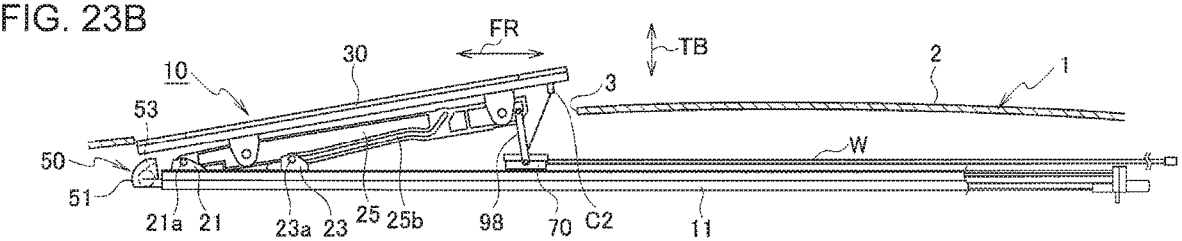
FIG. 23B is a schematic side view illustrating the sunroof in a tilt-up position according to the fourth embodiment of the present invention.
Figure 23C:
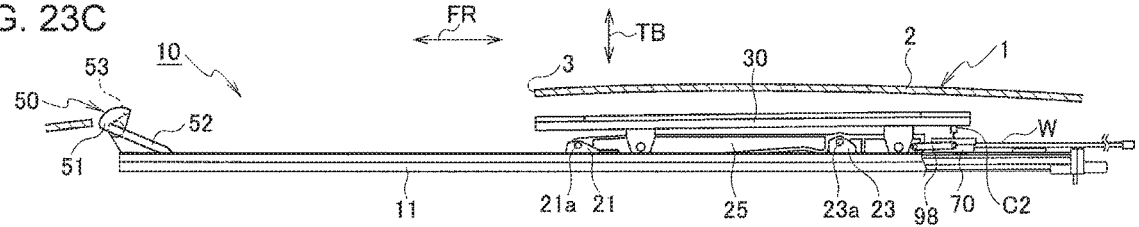
FIG. 23C is a schematic side view illustrating the sunroof in an open position according to the fourth embodiment of the present invention.

According to the fourth embodiment, electricity is continuously supplied from a power source on the vehicle body to the sunroof 30 through the flat cable W while the sunroof 30 is moving between the three positions in FIGS. 23A to 23C.

According to the fourth embodiment, the power supply structure for a movable body is also easy to install and has a very simple structure since the extra part draw-in mechanism 70 of the fourth embodiment is similar to that of the third embodiment.

According to the fourth embodiment, the extra part draw-in mechanism 70 is provided on the movable body or the sunroof 30, which eliminates the necessity for sparing a space for the extra part draw-in mechanism 70 at an end of one rail member 11 and makes the vehicle body compact.

The extra part draw-in mechanism of this embodiment may be replaced with the extra part draw-in mechanism 70A of the modified embodiment of the first embodiment (see FIG. 14). The extra part draw-in mechanism of this embodiment may be replaced with the extra part draw-in mechanism 91 of the second embodiment (see FIG. 18).

(Applications of Present Invention)

In the above embodiments, the sunroof 30 includes a light control panel and electricity is supplied to the light control panel, however, an embodiment of the present invention can be used for supplying electricity to a touch sensor on the sunroof 30 to prevent something from accidentally being caught by the sunroof 30. When the touch sensor detects something, a driving motor for the sunroof 30 is counterrotated. Electricity may be supplied to a light (an LED light) on the movable body or the sunroof 30.

In the above embodiments, the movable body is the sunroof 30 and the sunroof 30 is supplied with electricity, however, an embodiment of the present invention can be used for a power supply structure that supplies electricity to a movable body (such as a sunshade, a side glass, or a seat) that moves with respect to the vehicle body 1. An embodiment of the present invention can be used for a power supply structure that supplies electricity to a movable body of other body than a vehicle.

The extra part draw-in mechanism 70 of the first embodiment, the extra part draw-in mechanism 70A of the modified embodiment, and the extra part draw-in mechanism 91 of the second embodiment are vertically arranged with the axial direction of the central axis (axes) parallel to the horizontal direction, and the flat cable W is pulled out with its flat faces extending in the horizontal direction (the lateral direction). Alternatively, an extra part draw-in mechanism 91 may horizontally be arranged with the axial direction of the central axis (axes) parallel to the vertical direction, and the flat cable W may be pulled out with its flat faces extending in the vertical direction (the upright direction) as in the fourth embodiment. Alternatively, an extra part draw-in mechanism 91 may be arranged in any direction.

When the vehicle includes a solar panel instead of a movable glass, an embodiment of the present invention can be used for supplying electricity from the solar panel (a movable body) to the vehicle body 1.

In addition, an embodiment of the present invention may be a cable winding mechanism without the anti-twist cable storing section 75. In this case, the structure includes a cable W having one end coupled to the fixed part 1 and the other end coupled to the movable body 30, a cable winding mechanism that winds an extra part of the cable W. The cable winding mechanism includes a central axis 81 having a winding face 81a for the cable W on its outer circumferential face, a rotary body 80, 80A, or 93 rotatably supported with the central axis 81 at its center, a spiral spring (urging member) 90 that urges the rotary body 80, 80A, or 93 in the winding direction of the cable W, and a slit 77 that is formed in the central axis 81 and has an opening in the winding face 81a to accept and hold the cable W, the opening of the slit 77 in the winding face 81a being curved along the winding direction.

What is claimed is:

1. A power supply structure for a movable body that supplies electricity from a fixed part to a movable body or the movable body to the fixed part, comprising:
   a rail member fixed to the fixed part;
   a slider that moves along the rail member; and
   the movable body supported by the slider,
   the power supply structure for a movable body, further comprising:
   a flat cable having one end coupled to the fixed part and the other end coupled to the movable body; and
   an extra part draw-in mechanism that winds an extra part of the flat cable,
   the extra part draw-in mechanism, including
   a central axis having a winding face for the flat cable on its outer circumferential face,
   a rotary body arranged around the outer circumferential face of the central axis and rotatably supported with the central axis at its center,
   an urging member that urges the rotary body in a winding direction of the flat cable, and
   a slit that is formed in the central axis and has an opening in the winding face of the central axis to accept and hold the flat cable, the opening of the slit in the winding face of the central axis being curved along a winding direction.

2. The power supply structure for a movable body according to claim 1,
   wherein the rotary body includes an outer circumferential winding part having a winding face for the flat cable,
   an area around the outer circumferential winding part is an extra flat cable storing section and an area around the central axis is an anti-twist flat cable storing section, and
   a first part of the flat cable coupled to one of the movable body and the fixed part is fixed to the outer circumferential winding part, and a second part of the flat cable coupled to the other of the movable body and the fixed part is fixed in the slit in the central axis with a winding direction opposite to a winding direction in the outer circumferential winding part.

3. The power supply structure for a movable body according to claim 2,
   wherein the central axis rotates together with the rotary body, and
   an outer end of the second part of the flat cable stored in the anti-twist flat cable storing section is led to an outside space.

4. The power supply structure for a movable body according to claim 2,
   wherein the central axis is separate from the rotary body and does not rotate together with the rotary body, and
   an inner end of the second part of the flat cable stored in the anti-twist flat cable storing section is led to an outside space.

5. The power supply structure for a movable body according to claim 1, wherein the rotary body includes a plurality of rollers arranged around the central axis and spaced from each other in a circumferential direction, a part of the flat cable led to one of the movable body and the fixed part is fixed in the slit in the central axis, and a part of the flat cable led to the other of the movable body and the fixed part is led through a path between adjacent rollers of the rollers to an outside space, and the flat cable is wound in an inner circumferential area between the central axis and the rollers and in an outer circumferential area around the rollers.

6. The power supply structure for a movable body according to claim 1, wherein the movable body is a sunroof.

\* \* \* \* \*